(12) United States Patent
Kim et al.

(10) Patent No.: US 12,739,543 B2
(45) Date of Patent: Sep. 15, 2026

(54) SYSTEMS AND METHODS FOR MOUNTING DEVICES TO A FLAT SCREEN VIDEO MONITOR

(71) Applicant: Vizio, Inc., Irvine, CA (US)

(72) Inventors: Glen Gihong Kim, Anaheim, CA (US); Kasin Chan, Chino, CA (US)

(73) Assignee: VIZIO, INC., Irvine, CA (US)

( * ) Notice: Subject to any disclaimer, the term of this patent is extended or adjusted under 35 U.S.C. 154(b) by 325 days.

(21) Appl. No.: 18/543,516

(22) Filed: Dec. 18, 2023

(65) Prior Publication Data

US 2024/0121542 A1 Apr. 11, 2024

Related U.S. Application Data

(63) Continuation-in-part of application No. 18/240,700, filed on Aug. 31, 2023.

(Continued)

(51) Int. Cl.
*H04R 1/02* (2006.01)
*G01C 19/5783* (2012.01)
*H04R 5/02* (2006.01)

(52) U.S. Cl.
CPC ......... *H04R 1/025* (2013.01); *G01C 19/5783* (2013.01); *H04R 1/026* (2013.01); *H04R 2400/11* (2013.01); *H04R 2499/15* (2013.01)

(58) Field of Classification Search
CPC .......... H04R 1/025; H04R 1/026; H04R 5/02; G01C 19/5783

(Continued)

(56) References Cited

U.S. PATENT DOCUMENTS 6,305,892 B1 * 10/2001 Qiao ...................... H04R 1/025 411/510
8,879,761 B2 11/2014 Johnson et al.
(Continued)

FOREIGN PATENT DOCUMENTS

KR 1020050117799 A 6/2007
KR 1020210187959 B1 1/2023

OTHER PUBLICATIONS

English translation of KR1020050117799 from Total Patent.
English translation of KR1020210187959 from Total Patent.

*Primary Examiner* — Thjuan K Addy
(74) *Attorney, Agent, or Firm* — DICKINSON WRIGHT RLLP; Hector A. Agdeppa

(57) ABSTRACT

An audio-visual system includes a video monitor, such as a TV, and a soundbar. The soundbar is attachable to the video monitor by displacing a biased lock along a length, width, and/or height axis of the soundbar housing. Fasteners comprising detents are attached to a bottom surface of the video monitor and are spaced apart along a width axis of the video monitor. The soundbar includes a biased lock that comprises an engagement surface of a locking member that is biased in a first direction along a first axis. The detents engage and then disengage from the engagement surface, causing the soundbar to be locked to the detent and restrained from moving relative to the video monitor along one or more of a video monitor height, width, and length axis. The soundbar also has right and left speakers connected to respective right and left channels. When the soundbar sits on a horizontal surface with its upper wall above its lower wall, the right channel is connected to the right speaker, and the left channel is connected to the left speaker. When the soundbar is attached to the video monitor, it is inverted so that the soundbar's normally upper wall is below its normally lower wall. An inertial sensor detects the change in vertical ori- (Continued)

entation and provides a signal used by a controller that automatically reverses the channel connections so that the right channel is connected to the left speaker, and the left channel is connected to the right speaker.

20 Claims, 28 Drawing Sheets

Related U.S. Application Data

(60) Provisional application No. 63/402,522, filed on Aug. 31, 2022.

(58) Field of Classification Search
USPC ......................... 381/386, 388, 301, 306, 333
See application file for complete search history.

(56) References Cited

U.S. PATENT DOCUMENTS

| | | | | |
|---|---|---|---|---|
| 10,779,083 | B2 | 9/2020 | Stead et al. | |
| 11,009,906 | B1 * | 5/2021 | Justin | H04R 1/025 |
| 11,277,703 | B2 | 3/2022 | Crockett et al. | |
| 11,858,428 | B2 * | 1/2024 | Fay | B60R 11/0217 |
| 2011/0186705 | A1 * | 8/2011 | Ke | H04R 1/026<br>248/220.21 |
| 2020/0221217 | A1 | 7/2020 | Kim et al. | |
| 2021/0076117 | A1 | 3/2021 | Winton et al. | |
| 2022/0232188 | A1 | 7/2022 | Kim et al. | |
| 2023/0209231 | A1 | 6/2023 | Plummer et al. | |
| 2023/0209297 | A1 | 6/2023 | Li et al. | |

* cited by examiner 110
130
106
228a
216a
238a
112a
226a
224a
209
222a
120a
214a
z
y
x
104
230a
210a
217a
218a
234a
232a
236a
215a 110
130
106
228a
112a
238a
226a
120a
222a
209
214a
224a
z
y
x
104
230a
210a
217a
218a
234a
232a
216a
236a
215a 110
130
106
228a
112a
226a
238a
120a
222a
224a
209
214a
z
y
x
104
230a
210a
217a
218a
234a
232a
216a
236a
215a 106
110
130
104
112a
120a
209
210a
214a
215a
216a
217a
218a
222a
224a
226a
228a
230a
232a
234a
236a
238a
z
y
x

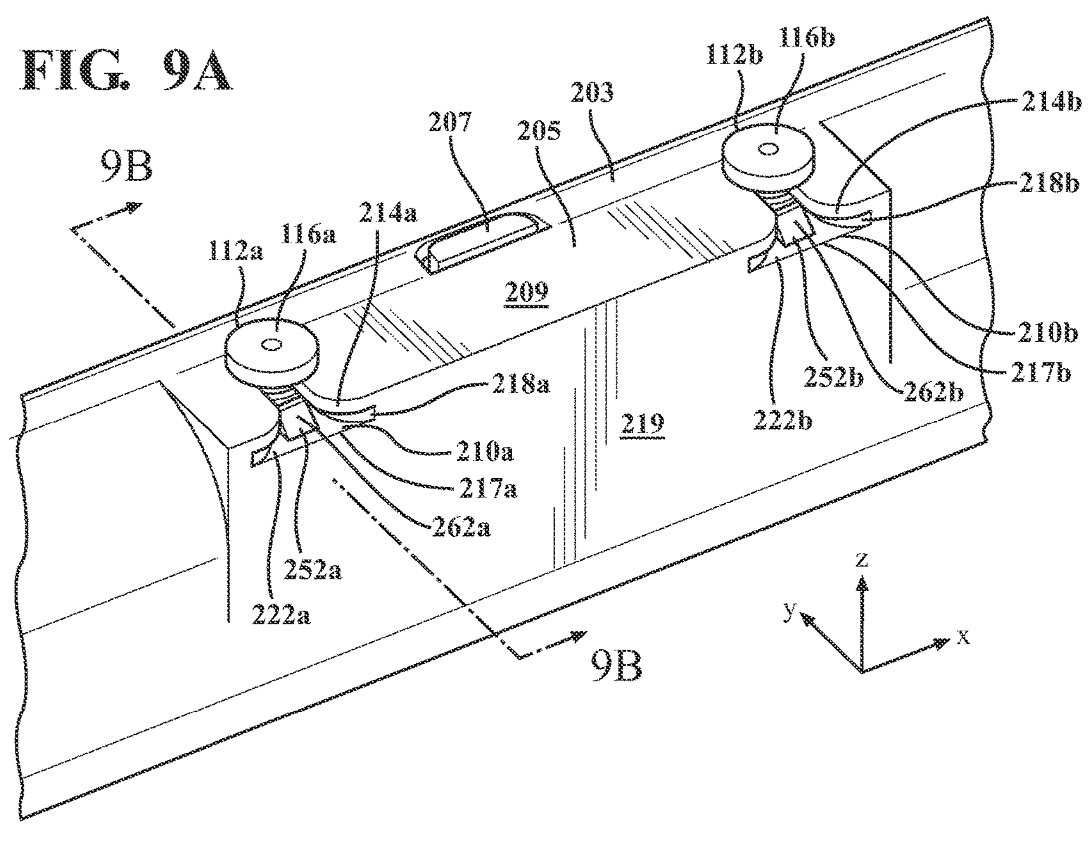
FIG. 9A
9B
207
205
203
112b
116b
214b
218b
112a
116a
214a
209
218a
210a
217a
262a
252a
222a
219
222b
252b
262b
210b
217b
9B
z
y
x
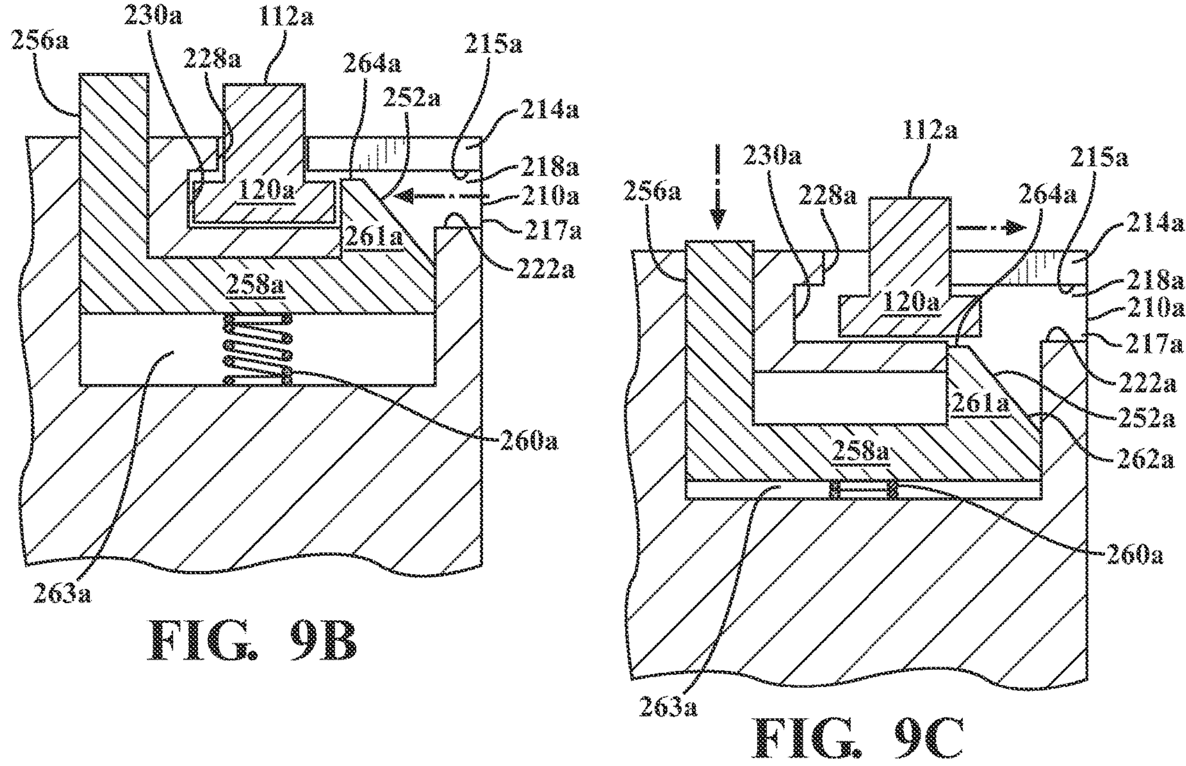
256a
230a
228a
112a
264a
252a
215a
214a
218a
210a
217a
222a
120a
261a
258a
260a
263a
FIG. 9B
230a
228a
112a
264a
215a
256a
214a
218a
210a
217a
222a
252a
262a
120a
261a
258a
260a
263a
FIG. 9C 100
108
106
110
207
112b
203
112a
206
212
204
104
z
y
x
200
202
208
100
108
106
110
207
203
206
212
204
104
z
y
x
200
202
208

100
106
108
110
207
203
206
212
204
200
202
208
z
y
x
100
106
108
110
207
205
203
206
104
212
204
202
208
200
z
y
x 13B
203
205
209
219
118a
116b
118b
116b
120b
270b
214b
218b
217b
222b
218a
214a
120a
222a
217b
13B
z
y
x
228a
112a
230a
274a
238a
215a
214a
120a
218a
210a
270a
217a
222a
272a
236a
282a 228a
238a
112a
230a
274a
215a
210a
120a
217a
222a
270a
272a
282a 100
108
106
110
209
203
206
104
212
204
202
208
z
y
x
100
108
106
110
z
206
104
212
204
y
x 202
208

310b
314b
311b
318b
317b
322b
312b
220b
315b
112b
118b
116b
120b
322a
317a
306
308
310a
320a
320b
112a
118a
116a
120a
318a
315a
312a
311a
314a
z
x
y

FIG. 23A
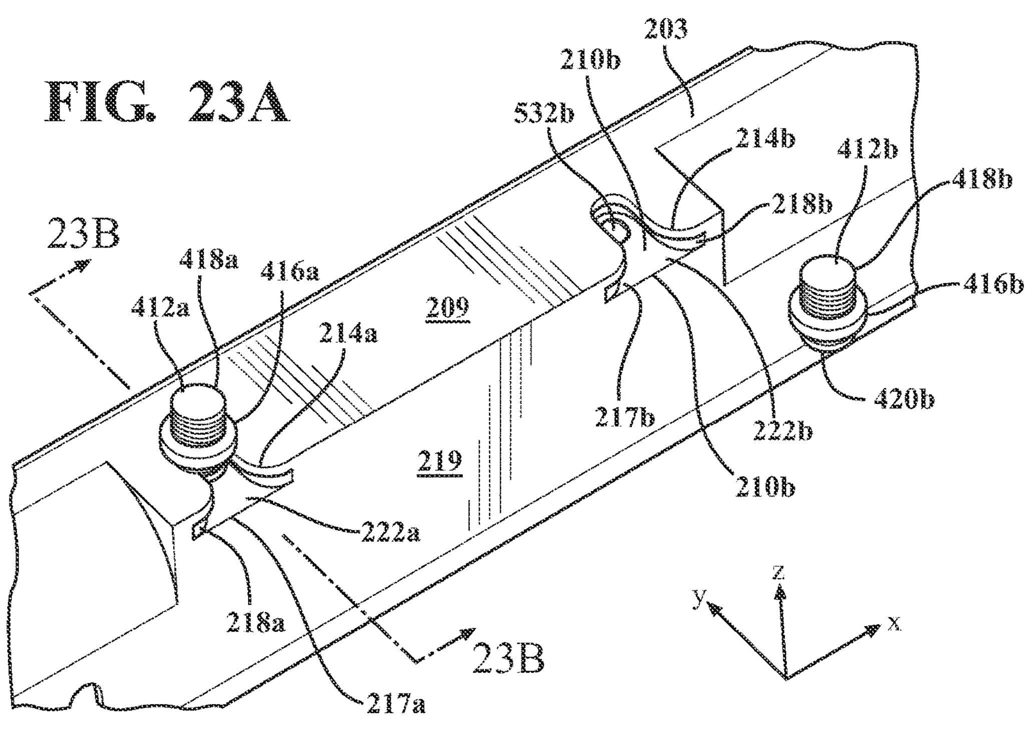
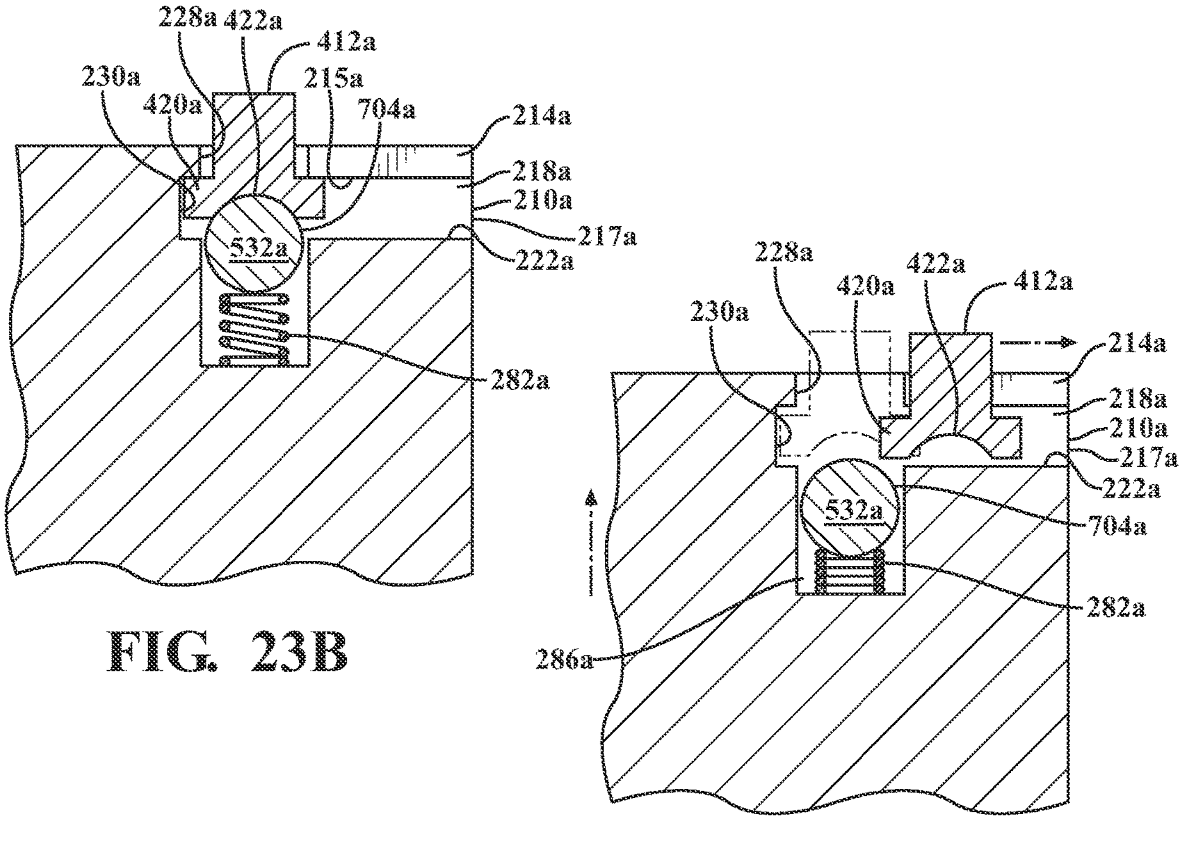
FIG. 23B
FIG. 23C

SYSTEMS AND METHODS FOR MOUNTING DEVICES TO A FLAT SCREEN VIDEO MONITOR

CROSS-REFERENCE TO RELATED APPLICATIONS

This application is a continuation-in-part of U.S. patent application Ser. No. 18/240,700, filed on Aug. 31, 2023, which claims the benefit of U.S. Provisional Patent Application No. 63/402,522, filed on Aug. 31, 2022, the entirety of each of which is hereby incorporated by reference.

TECHNICAL FIELD

This disclosure relates generally to securely and conveniently mounting certain consumer electronic devices such as sound bars to other devices such as flatscreen televisions or to other potential supports without the use of tools.

BACKGROUND

A smart TV is an internet-connected television that offers a range of online features, such as on-demand content from apps and access to streaming services, as well as the ability to connect other wireless devices to the smart television. However, due to their thin front-to back-dimensions, flatscreen televisions generally do not come with significant internal audio speakers. Hence, a standalone speaker system, usually called a "soundbar", has become a popular accessory to enhance the TV's audio output. The mounting of such soundbars is typically done underneath or on top of the host flat screen TV after the TV is mounted on a wall; usually by using brackets and screws to secure the soundbar. This step requires tools and skills that not all prospective users will have, and the semi-permanent mounting of additional electronics to an interior wall may damage the wall's surface.

It may be desirable to provide a soundbar that can be placed on a tabletop or other horizontal surface and which can alternatively be attached to the bottom of a TV or other video monitor. However, if the soundbar includes mounting features for connecting the soundbar to the TV, it may be aesthetically preferable to conceal those mounting features when the soundbar is placed on a tabletop by placing those features on the surface of the soundbar that will rest on the table. To provide both alternatives, the soundbar must be oriented in opposite vertical orientations ("right side-up" versus "upside down") when it is resting on a tabletop versus when it is attached to the bottom surface of a TV. However, when opposite vertical orientations are used, the speakers will switch right and left locations relative to the listener. For example, when the soundbar rests on a table, the right speaker will be positioned to the right of the left speaker, and vice-versa. However, when the soundbar is attached to the TV, it will be in an upside down orientation. Thus, the speaker that would be on the left in the right side-up orientation will be on the right and vice-versa, which means that content designated for the left speaker will be played from the right speaker and vice-versa. Thus, a need has arisen for a soundbar and an audio-visual system incorporating a soundbar which addresses the foregoing issues.

SUMMARY

In accordance with a first aspect of the present disclosure, a soundbar is provided which comprises a housing, at least one speaker located in the housing, and a biased lock having a locked and an unlocked condition. The biased lock is movable from an unlocked to a locked condition in response to a force applied by a detent, and when the biased lock is in the locked condition, the housing is restrained from moving relative to the detent along at least one axis of the housing. In certain examples, an audio-visual system comprising a video monitor and the soundbar is provided. The video monitor has a top surface, a bottom surface, and a fastener having the detent connected to the bottom surface. When the soundbar is attached to the video monitor, and the biased lock is in the locked condition, the detent is restrained by the biasing lock from moving along at least one of a housing length axis, a housing width axis, and a housing height axis.

In accordance with a second aspect of the present disclosure, an audio visual system is provided which comprises a video monitor and a soundbar comprising a housing, a first speaker, a second speaker, a first channel, and a second channel. The housing has a first horizontal wall and a second horizontal wall, and when the first horizontal wall is vertically above the second horizontal wall, the soundbar is configured to selectively connect the first channel with the first speaker and the second channel with the second speaker, and when the second horizontal wall is vertically above the first horizontal wall, the soundbar is configured to selectively connect the second channel with the first speaker and the first channel with the second speaker. The video monitor has a top surface and a bottom surface, and the second horizontal wall of the soundbar is connected to the bottom surface of the video monitor.

In accordance with a third aspect of the present disclosure, a method of attaching a soundbar to a video monitor is provided. The soundbar has a housing, first and second channels, and first and second speakers located in the housing. The housing comprises first and second horizontal surfaces, and the video monitor has a top surface, a bottom surface, and a display. When the first horizontal surface of the housing is vertically above the second horizontal surface of the housing, the first channel is selectively connected to the first speaker, and the second channel is selectively connected to the second speaker. The method comprises attaching the second horizontal surface of the housing to the bottom surface of the video monitor and selectively connecting the second channel to the first speaker, and the first channel to the second speaker.

In accordance with a fourth aspect of the present disclosure, a method of attaching a soundbar having a housing comprising first and second speakers, a first horizontal wall and a second horizontal wall to a video monitor having a top surface, a bottom surface, and a display is provided. The method comprises engaging a fastener connected to the video monitor lower surface and a biased lock engagement surface located in the soundbar housing; and disengaging the detent and the biased lock engagement surface.

BRIEF DESCRIPTION OF THE DRAWINGS

Features, embodiments, and advantages of the present disclosure are better understood when the following Detailed Description is read with reference to the accompanying drawings;

FIG. 9A is a close-up perspective view of a central rear section of the soundbar of FIG. 7;

FIGS. 9B and 9C are cross-sectional views of the biased lock of the soundbar of FIG. 7 showing the biased lock in a locked condition and just prior to the completion of an unlocking operation, respectively;

FIG. 23A is a close-up view of a central rear section of the soundbar of FIG. 22 used to illustrate the engagement of fasteners with detents and a soundbar biased lock;

FIGS. 23B-23C are cross-sectional views of one of the biased locks of FIG. 23A engaging a flat-screen TV fastener following a locking and unlocking operation, respectively;

FIG. 26A is a block diagram showing an inertial sensor comprising a combination accelerometer and gyroscope semiconductor device;

DETAILED DESCRIPTION

The ability to mount devices or accessories to the bottom of a TV or other type of video monitor without requiring special brackets or tools is an advantage for the ordinary household by simplifying the process of adding improvements and other useful extensions. It furthermore makes popular accessories more attractive by removing the installation barrier and, hence, improves sales. Described herein are audiovisual systems in which a soundbar can be installed on a TV or other type of video monitor by sliding a fastener attached to the TV housing and having a detent into a guide channel formed in the soundbar housing to lock the fastener in place within the housing. This type of configuration may be referred to as a "push and click" arrangement herein.

In certain embodiments, the soundbar's "bottom" surface or "base" is attached to the underside of the TV, thus orienting the soundbar in an "upside down" orientation. In certain embodiments described herein, when an upside down soundbar orientation is detected, the right and left channels are selectively and automatically connected to the left and right speakers, respectively, to account for the fact that they have effectively reversed their positions (i.e., relative to the listener, the left speaker is now on the right and vice-versa).

Figure 1:
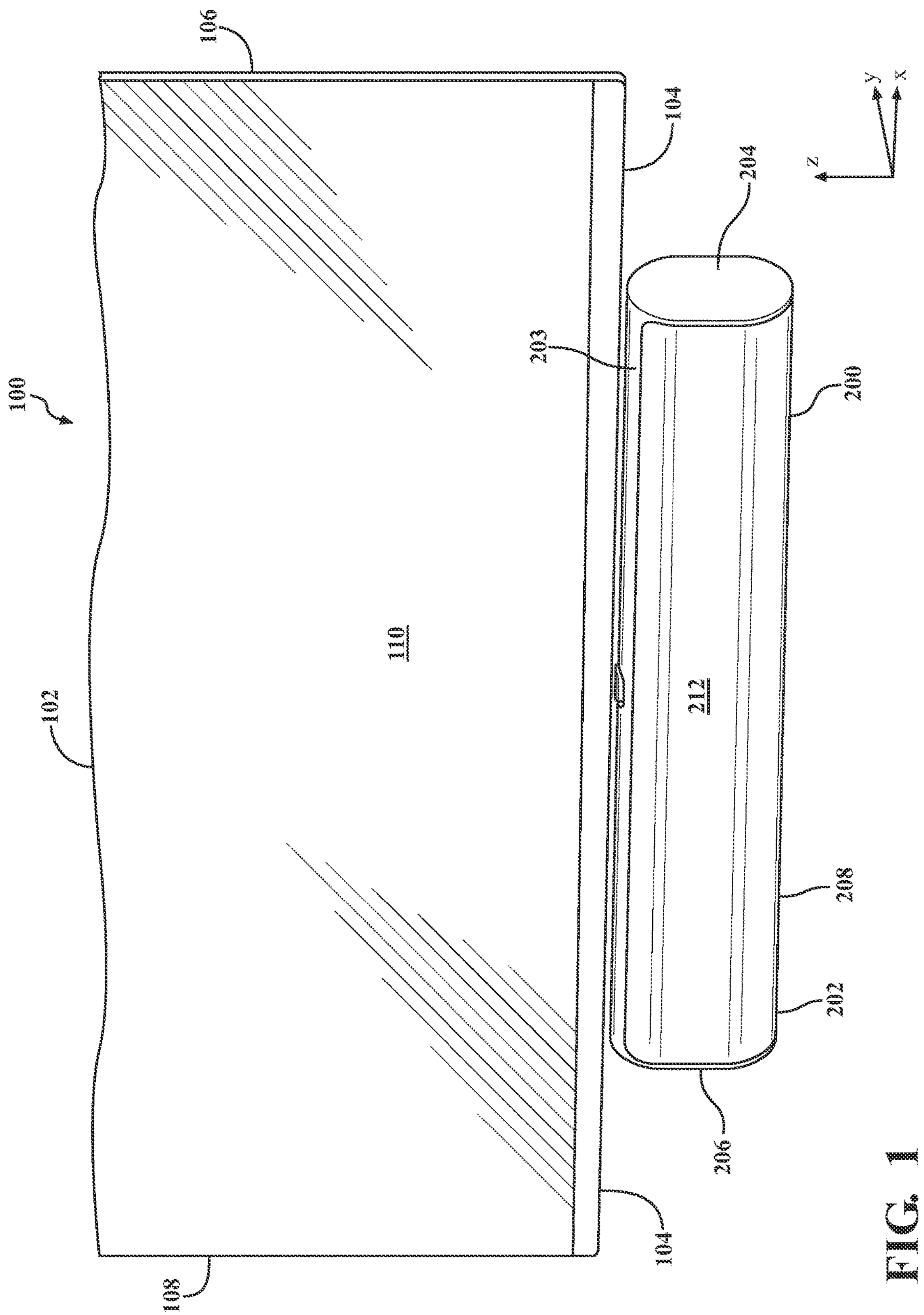
FIG. 1 is a front perspective view of an audio-visual system comprising a flat screen TV and an attached soundbar, in accordance with a first embodiment of the present disclosure.
Figure 2:
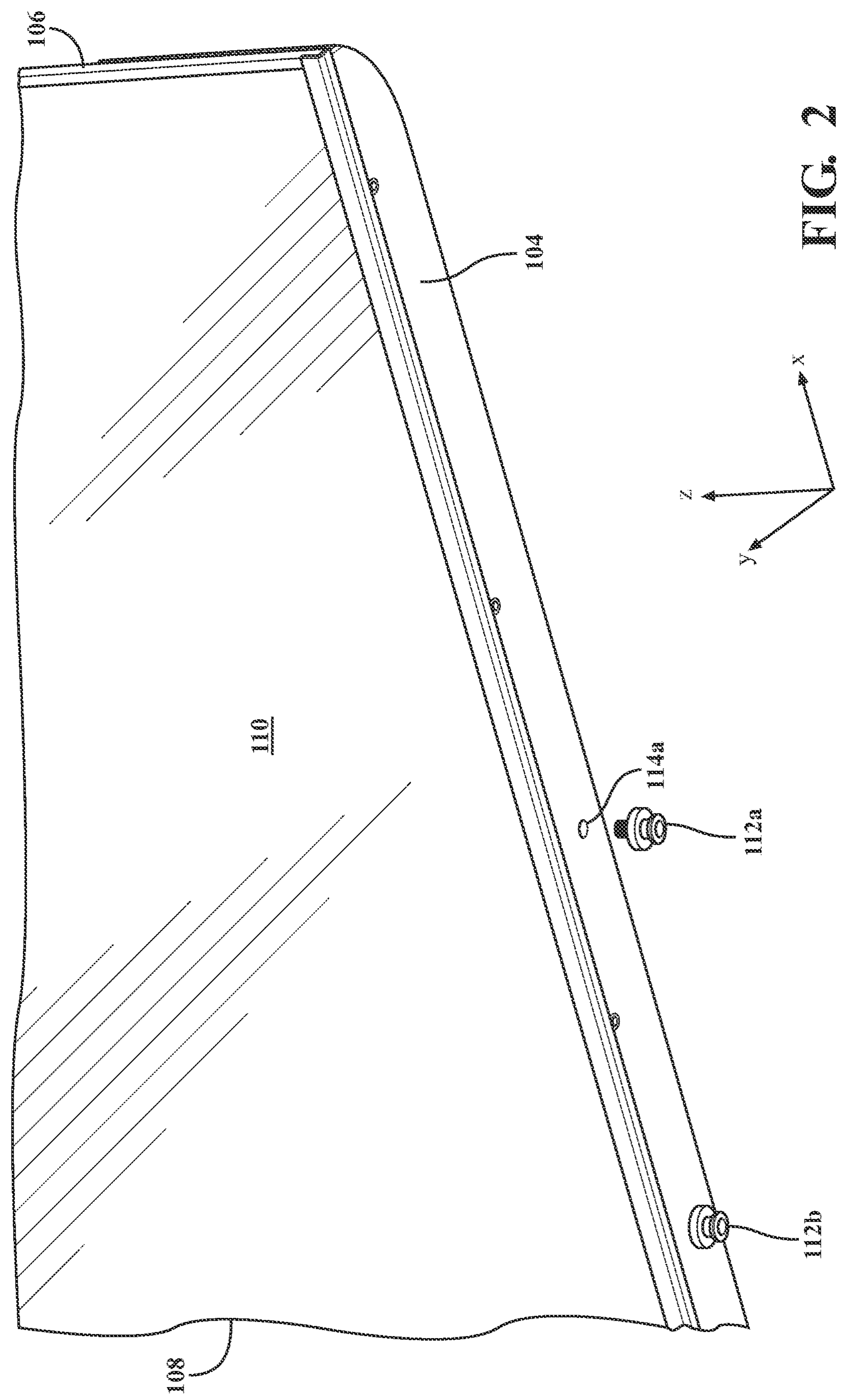
FIG. 2 is a close-up exploded view of the flat screen TV of FIG. 1 illustrating the attachment of fasteners with detents used to attach the soundbar to the flat screen TV.

As shown in FIGS. 1-3, an audiovisual system comprising a flat screen TV 100 (which may also be any other type of video monitor) and a soundbar 200 is depicted. TV 100 has a top surface 102 and a bottom surface 104 which are spaced apart from one another along a TV height (z) axis, and right and left sides 106 and 108 which are spaced apart from one another along a TV width (x) axis. A rear surface 130 (not shown in FIGS. 1-3) is positioned opposite display 110 and is spaced apart from display 110 along a TV thickness (y) axis.

A soundbar 200 is attached to the bottom surface 104 of the TV 100. Soundbar 200 comprises a housing 202 and a plurality of internal speakers (not shown) contained within housing 202. The speakers are positioned along a soundbar housing length (x) axis and are spaced apart from one another along the soundbar housing length (x) axis. The soundbar 200 also contains a controller that is configured to selectively route channels (internal communication pathways for transmitting sounds generated by the TV 100) to selected ones of the speakers based on a soundbar housing orientation signal provided by an inertial sensor.

Figures 3A, 3B:
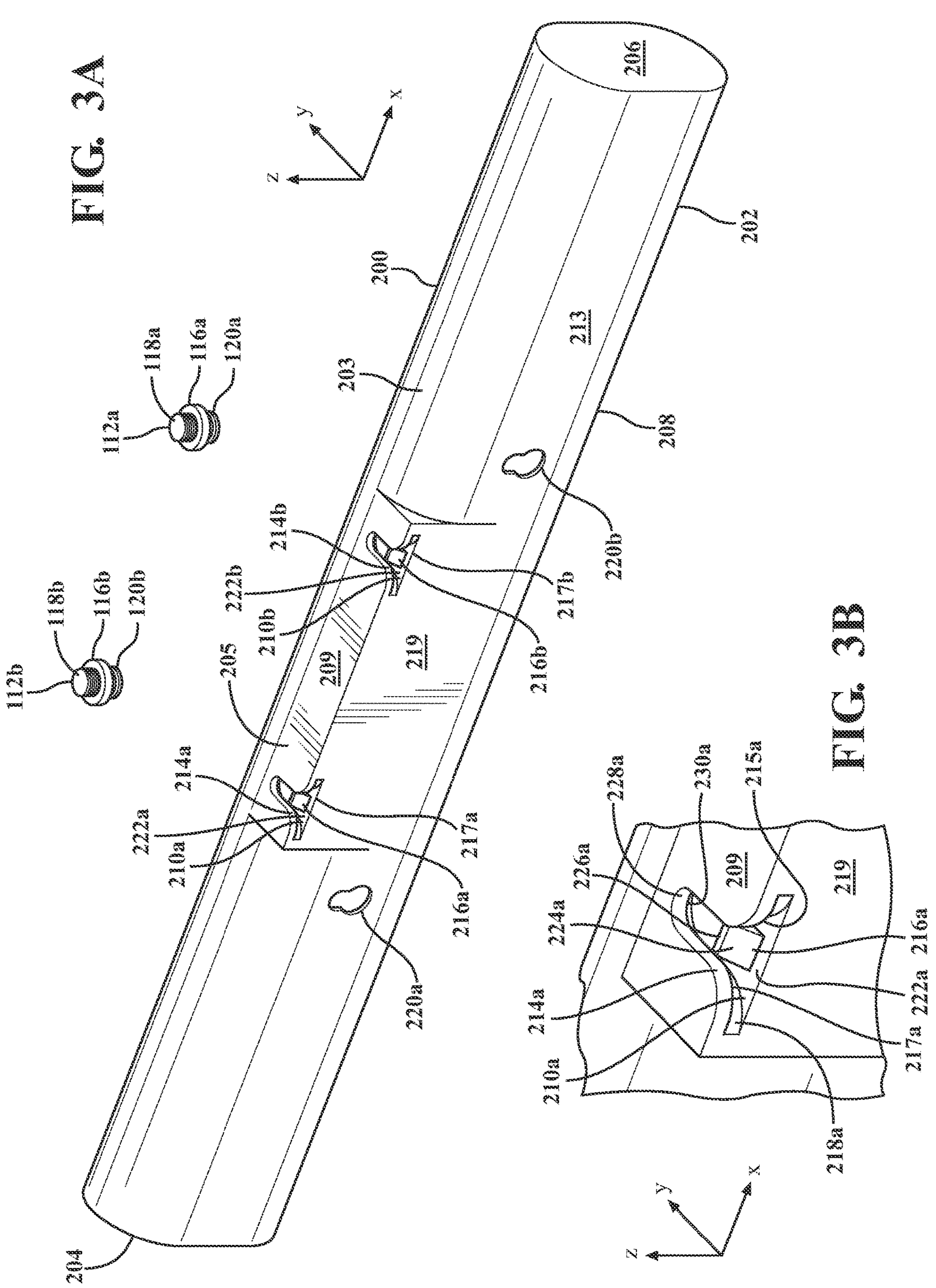
FIG. 3A is a rear perspective view of the soundbar and fasteners of FIG. 1.
FIG. 3B is a close-up view of one of the soundbar installation grooves of FIG. 3A.

Soundbar housing 202 also has first and second horizontal surfaces 208 and 203 which are spaced apart from one another along a soundbar housing height (z) axis. The term "horizontal" as used does not refer to and is not limited to a planar surface and may also encompass curved surfaces that are oriented parallel to the ground or a floor. As shown in FIG. 3A, horizontal surface 203 is formed from curved members that are attached along a longitudinal midline of the soundbar 200. Horizontal surface 203 also includes a planar section defined by horizontal panel 209 of central rear housing 205. Thus, horizontal surface 203 includes both curved and planar sections. When soundbar 200 is attached to TV 100 as shown in FIG. 1, horizontal surface 203 is an "upper surface" and horizontal surface 208 is a "lower surface" because of the positioning of the surfaces 208, 203 relative to one another and to the Earth.

In the orientation shown in FIG. 1, the soundbar is "upside down" because horizontal surface 203 is normally considered to be the "base" or "bottom" of the soundbar and rests on a table or a bracket or some other support surface when soundbar 200 is not attached to TV 100. In the example of FIGS. 1-3A, when soundbar 200 is placed on a tabletop, separate base members may be attached to a portion of horizontal surface 203 to provide for more stable support, as will be discussed below with respect to FIG. 28.

In the upside down orientation of FIGS. 1-3A horizontal surface 203 is vertically above horizontal surface 208, whereas in a "right-side up" orientation, horizontal surface 208 is vertically above horizontal surface 203. As a result, in the upside down orientation, the soundbar speaker (not shown) which would normally be considered the "right" speaker relative to the listener is the "left" speaker relative to the listener when soundbar 200 is in the upside down orientation. Orienting the soundbar 200 with horizontal surface 203 vertically beneath horizontal surface 208 allows the soundbar installation grooves 210*a* and 210*b* to be concealed from view when soundbar 200 is in a "right side-up" orientation, which provides a more aesthetically pleasing appearance. Rear surface 213 of soundbar housing 202 also includes two key hole openings 220*a* and 220*b* which are spaced apart along the soundbar length (x) axis for mounting soundbar 200 on a wall.

Upper horizontal surface 203 of soundbar housing 202 is attached to two fasteners 112*a* and 112*b* which threadingly engage respective fastener openings 114*a* and 114*b* (not shown) in bottom surface 104 of a video monitor, in this case, TV 100. Fastener openings 114*a* have centers that are spaced apart by a distance (also called a "pitch") along the TV width (x) axis) that ranges from about 200 mm to about 400 mm, preferably from about 250 mm to about 350 mm, and more preferably from about 280 mm to about 320 mm. In one specific example, the pitch is about 300 mm FIG. 2 shows the fasteners 112*a* and 112*b* spaced apart from one another by a corresponding distance along soundbar housing length (x) axis and the TV width (x) axis. Each fastener 112*a* and 112*b* includes a respective "detent" 120*a*, 120*b*, which is a circular flange at the bottom of each fastener 112*a*, 122*b*. As used herein, "detent" refers to a device that is used to restrain or limit the movement of soundbar 200 relative to TV 100. Referring to FIGS. 3A-6C, soundbar housing 202 contains two biased locks 211*a*, 211*b* (reference numerals not separately identified in the figures) that are spaced apart from one another along a length (x) axis of the housing. Each biased lock 211*a*, 211*b* comprises a corresponding polygonal locking member 216*a*, 216*b* and a corresponding biasing spring 232*a*, 232*b*. The polygonal locking members 216*a*, 216*b* and their respective springs 232*a*, 232*b* are contained in internal spring housings 234*a*, 234*b*. First and second soundbar housing sides 204 and 206 are spaced apart from one another along a soundbar housing length (x) axis. Front and rear surfaces 212 and 213 are spaced apart along a soundbar housing thickness (y) axis.

The structure and operation of biased lock 211*a* will now be described with the understanding that biased lock 211*b* has the same structure. The central rear section of soundbar 200 includes a central rear housing 205 which houses biased lock 211*a* and which comprises a horizontal panel 209 connected to a vertical panel 219. Soundbar installation grooves 210*a* and 210*b* are formed in horizontal panel 209 and have lengths that extend along the soundbar housing thickness (y) axis. Each groove 210*a* and 210*b* has a respective entry opening 217*a*, 217*b* and groove floor 222*a* and 222*b*. When the soundbar 200 is installed on TV 100, fastener detents 120*a* and 120*b* slidingly engage respective groove floors 222*a* and 222*b* and as the soundbar is moved from display 110 toward the rear 130 of the TV along the soundbar housing thickness (y) axis and the TV thickness (y) axis, the detents 120*a* and 120*b* eventually respectively engage and depress respectively polygonal locking members 216*a* and 216*b* along the soundbar housing vertical (z) axis.

Referring to FIG. 3B, a close-up view of soundbar installation groove 210*a* is provided. The soundbar 200 is in an unlocked condition in FIG. 3B. Soundbar installation groove 210*b* has the same structure and operates the same way. Thus, polygonal locking member 216*a* projects above the plane of the groove floor 222*a* along the soundbar housing vertical (z) axis. The groove 210*a* is defined by an upper groove wall 214*a* that is immediately vertically above a lower groove wall 218*a*. The walls 214*a* and 218*a* and groove floor 222*a* define the groove 210*a*. Upper wall 214*a* defines an open area in the x, y plane which is less than the open area in the x, y plane defined by lower groove wall 218*a*. Groove entry opening 217*a* has a width along the soundbar housing length (x) axis that is greater than the diameter of the detent 120*a*, so that detent 120*a* can enter groove 210*a*. The width of the groove 210*a* defined by the upper and lower groove walls 214*a* and 218*a* and narrows when moving along the soundbar housing thickness (y) axis from the groove entry opening 217*a* and toward the end of the groove 210*a*, which is defined by the end point 228*a* of the upper wall 214*a* and the end point 230*a* of the lower groove wall 218*a*. However, the open area in the x, y plane defined by the lower wall 218*a* is greater than that defined by the upper wall 214*a*. As a result, a downward facing surface 215*a* of upper wall 214*a* will restrain the vertical movement of detent 120*a* once it passes the polygonal locking member 216*a*. In addition, the downward facing surface 215*a* is recessed near the end of the groove 210*a* to create a recess 238*a*. Due to the biasing action of polygonal locking member 216*a*, recess 238 prevents horizontal movement of the soundbar 200 when the detent 120*a* reaches the closed end of the groove 210*a* and soundbar 200 is released by the user.

Figure 4:
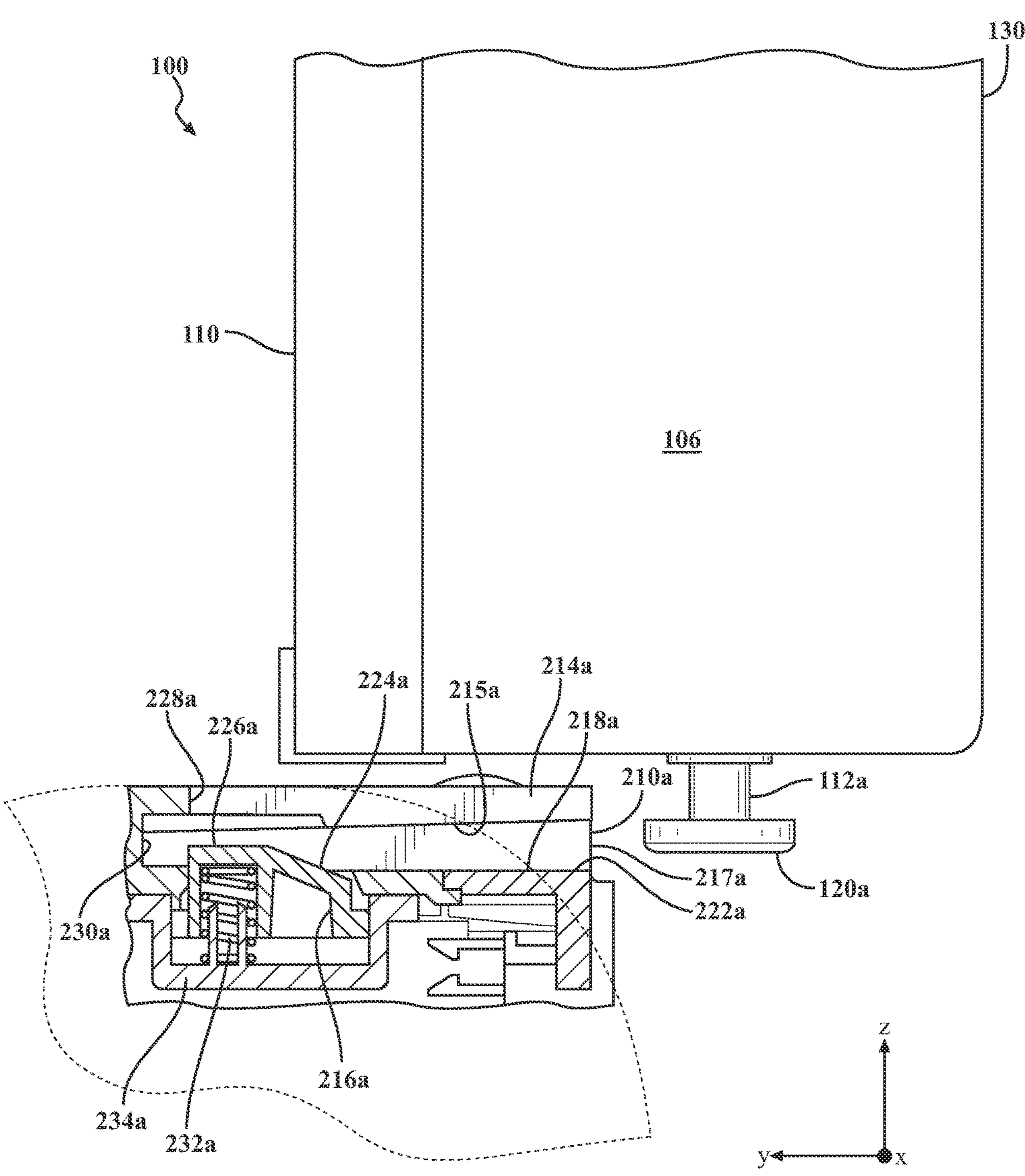
FIG. 4 is a cross-sectional view of the soundbar of FIG. 1 shown during an installation of the soundbar on the flat screen TV of FIG. 1.

FIG. 4 shows a cross-section of central rear housing 205. Soundbar housing 202 is shown in phantom to indicate the location of the central rear housing 205 and the biased lock (comprising polygonal locking member 216*a* and spring 232*a*) relative to housing 202. Spring 232*a* applies a biasing force in the vertically upward direction along the soundbar housing height (z) axis against polygonal locking member 216*a*, which in turn applies the biasing force to fastener 112*a*. Because the fastener 112*a* is essentially stationary along the vertical (z) axis, that biasing force pushes the soundbar housing 202 vertically downward along the soundbar housing height (z) axis relative to TV 100 to seat the detent 120*a* within recess 238*a* created in the downward facing surface 215*a* of upper groove wall 214*a*, which in turn restrains the movement of soundbar 200 along the soundbar housing height (z), length (x), and thickness (y) axes.

Figures 5A, 5B, 5C:
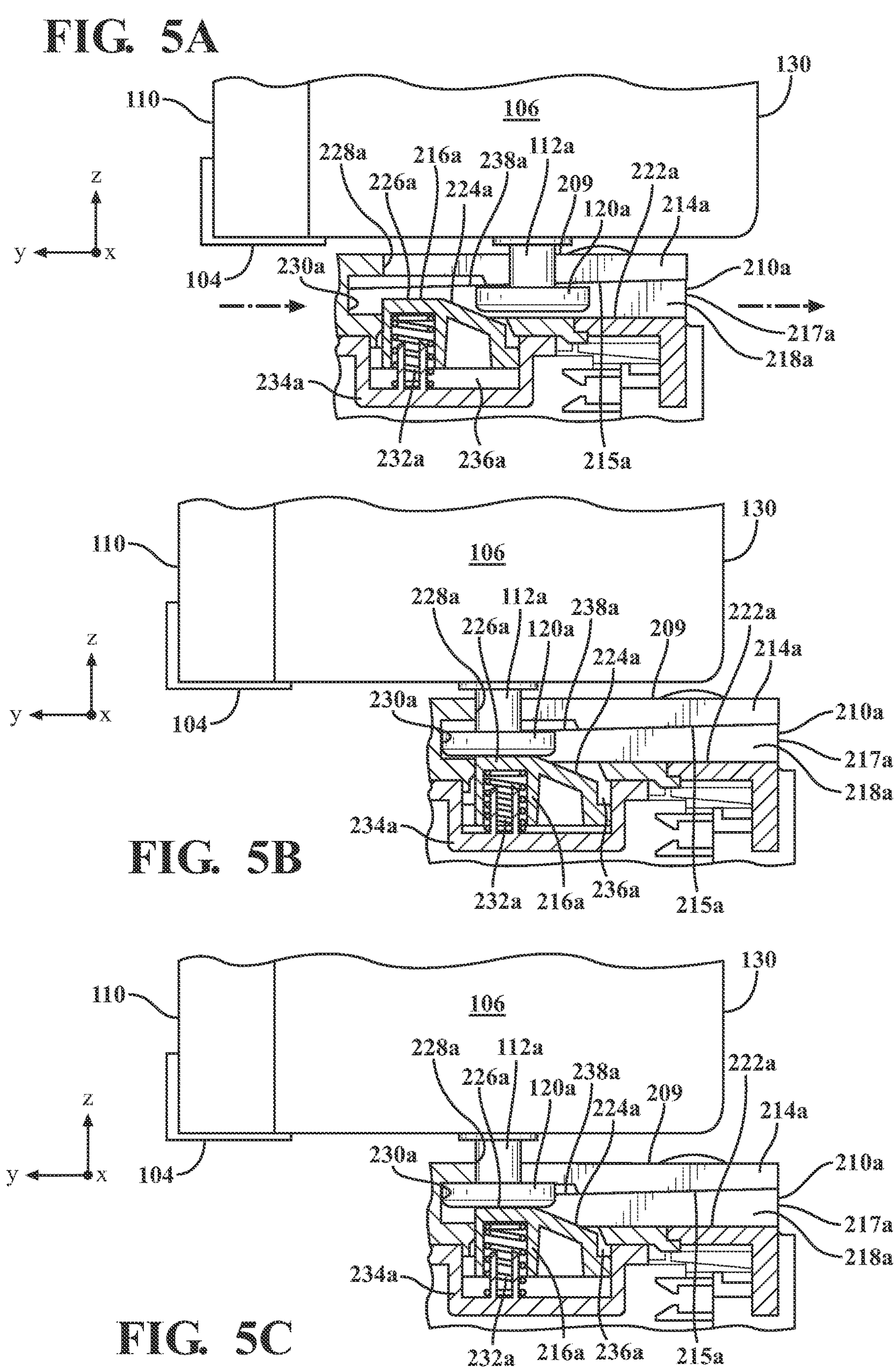
FIGS. 5A-5C are cross-sectional views of the soundbar of FIG. 1 during the installation of the soundbar on the flat-screen TV of FIG. 1.

The operation of the biased lock 211*a* during a soundbar 200 installation operation is shown in FIGS. 5A-5C. Referring to FIG. 5A, soundbar installation groove 210*a* is aligned with fastener 112*a* so that detent 120*a* is aligned with groove entry opening 217*a* and flush against the groove floor 222*a*. Soundbar installation groove 210*b* and its corresponding fastener 112*b* are aligned similarly. Soundbar 200 is then pushed along the TV thickness (y) axis in a direction from the TV display 110 toward the rear surface 130 of TV 100. When the soundbar 200 reaches the position along the TV thickness (y) axis shown in FIG. 5A, detent 120*a* begins to engage first detent engagement surface 224*a* of polygonal lock member 216*a*. First detent engagement surface 224*a* is generally planar and slopes upward in the y-z plane when viewed along the soundbar housing length (x) axis and moving from TV rear surface 130 toward TV display 110 along the TV thickness (y) axis. As a result, the continued movement of soundbar 200 along the TV thickness axis progressively depresses polygonal locking member 216*a* along the soundbar housing height (z) axis until the detent 120*a* abuts the end 230*a* of lower wall 218*a* of groove 210*a*, which is shown in FIG. 2B. At this point, detent 120*a* disengages from first detent engagement surface 224*a*. In FIG. 5B the user is still applying a vertically upward force on soundbar 200 so that the detent 120*a* pushes the polygonal locking member 216*a* vertically downward along the soundbar housing height (z) axis. When the user releases soundbar 200, the biasing action of spring 232*a* pushes the soundbar housing 202 vertically downward along the soundbar housing height (z) axis relative to the fastener 112*a*, causing the detent 120*a* to seat in the recess 238*a* formed in the downward facing surface 215*a* of upper wall 214*a*, which in turn restrains soundbar 200 from downward vertical movement along the soundbar housing height (z) axis and horizontal movement in the plane of the soundbar housing length (x) and thickness (y) axes relative to TV 100. Thus, in FIG. 5C soundbar 200 and biased lock 211*a* are in a locked condition, with the detent 120*a* engaging a second engagement surface 226*a* of the polygonal locking member 216*a* and second engagement surface 226*a* projecting above groove floor 222*a* along the soundbar housing height (z) axis into a recess defined by groove floor 222*a* and the upper and lower groove walls 214*a* and 218*a*. In either the locked or unlocked condition, polygonal locking member 216*a* projects above groove floor 222*a* and into groove 210*a*. However, polygonal locking member 216*a* projects a greater distance above the groove floor 222*a* along the soundbar housing height (z) axis when soundbar 200 is in the unlocked condition than in the locked condition because of the engagement of detent 120*a* and polygonal locking member 216*a* in the locked condition.

Figures 6A, 6B, 6C:
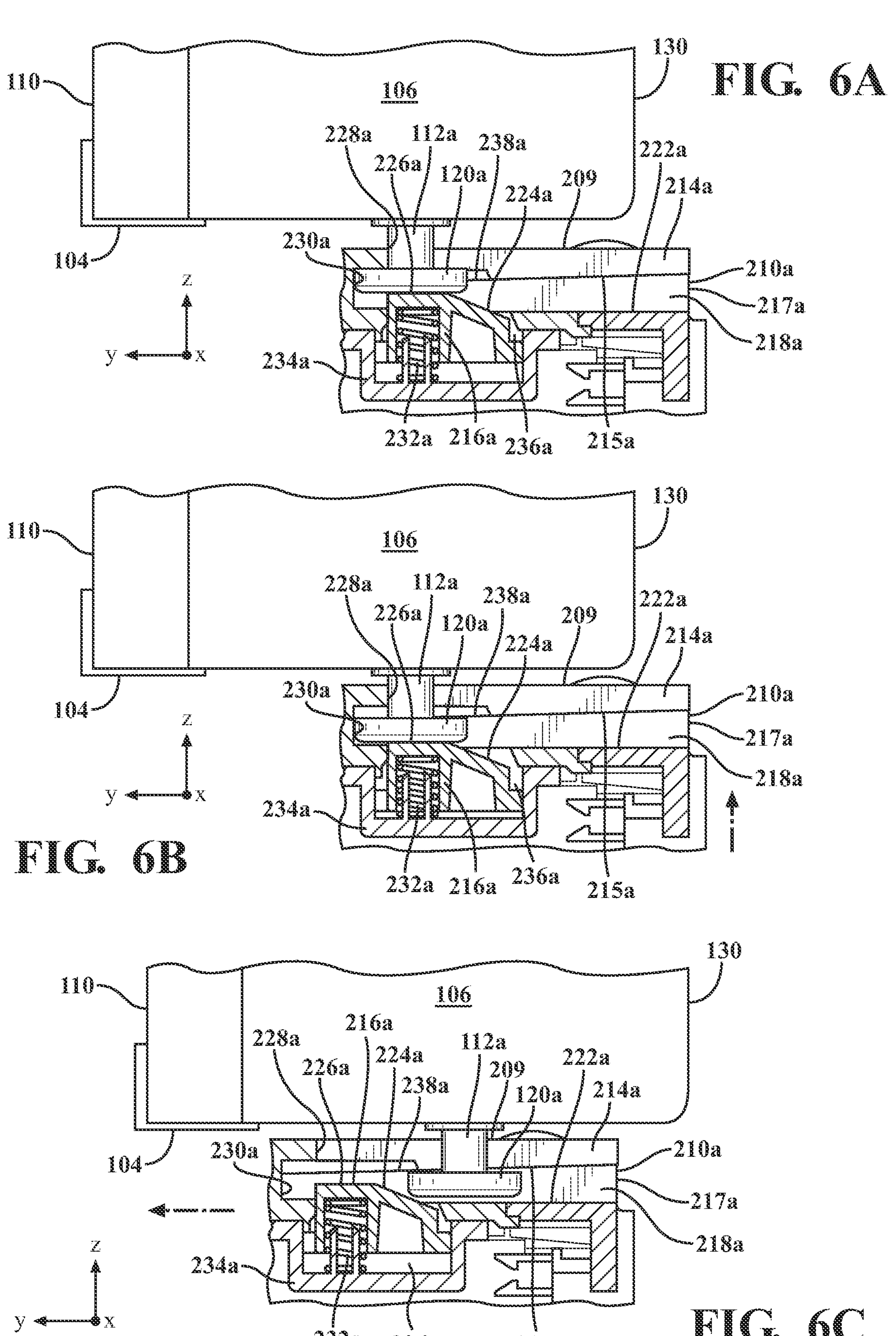
FIGS. 6A-6C are cross-sectional views of the soundbar of FIG. 1 during an uninstallation of the soundbar of FIG. 1 from the flat screen TV of FIG. 1.

An uninstallation operation of soundbar 200 from TV 100 will now be described with reference to FIGS. 6A-6C. In FIG. 6A soundbar 200 is in the locked condition of FIG. 5C. In order to release biased lock 211*a*, a user pushes soundbar 200 vertically upward (as indicated by the upward arrows in the figure) along the soundbar housing height (z) axis and TV height (z) axis as shown in FIG. 6B, thereby depressing polygonal locking member 216*a* along the soundbar housing height (z) axis. Soundbar 200 can be pushed upward along the soundbar housing height (z) axis relative to TV 100 until detent 120*a* engages the underside of groove floor 222*a*. As shown in FIG. 6C, with soundbar 200 pushed vertically upward, it can be pulled in a direction from the rear TV surface 130 toward display 110 along the TV thickness (y) axis so that detent 120*a* exits the entry opening 217*a* of groove 210*a*. The second fastener detent 120*b* will also exit opening 217*b* of groove 210*b* in a similar fashion. Thus, once fasteners 112*a* and 112*b* are installed on the bottom surface 104 of TV, soundbar 200 can be installed on TV 100 merely by pulling it along the TV thickness (y) axis (while holding it to depress polygonal locking member 216*a*) until it reaches the end 230*a* of lower groove wall 218*a* without using any tools. Soundbar 200 can then be removed from TV 100 by pushing it up to depress polygonal lock member 216*a* and pulling it until detent 120*a* clears the location of polygonal lock member 216*a* and exits groove 210*a* without the need for tools. Fasteners 112*a* and 112*b* are preferably thumbscrews that are attachable to bottom surface 104 of TV 100 without the use of any tools.

Figure 7:
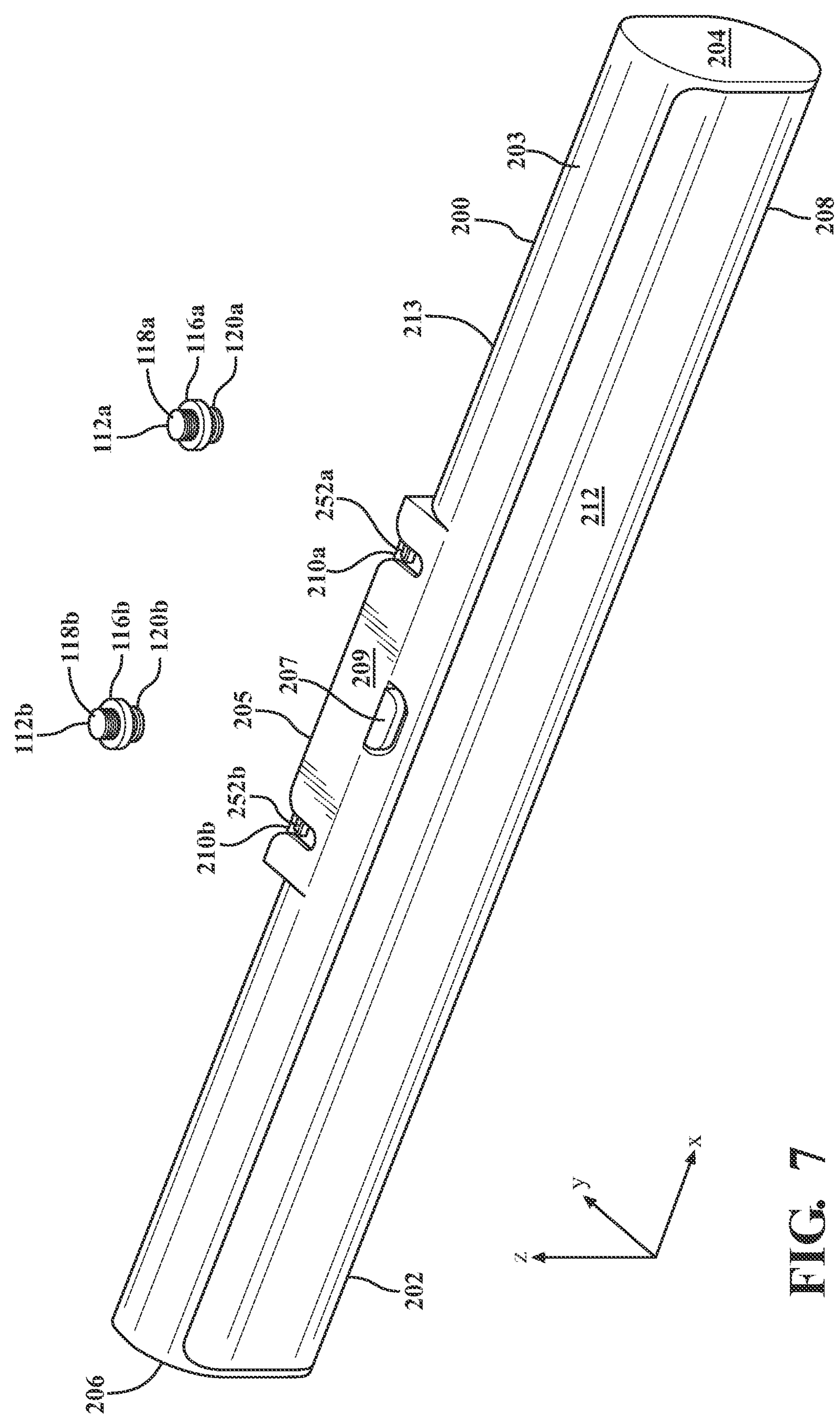
FIG. 7 is a front perspective view of a soundbar configured for installation on a flat-screen TV in accordance with a second embodiment of an audio-visual system of the present disclosure.
Figure 8:
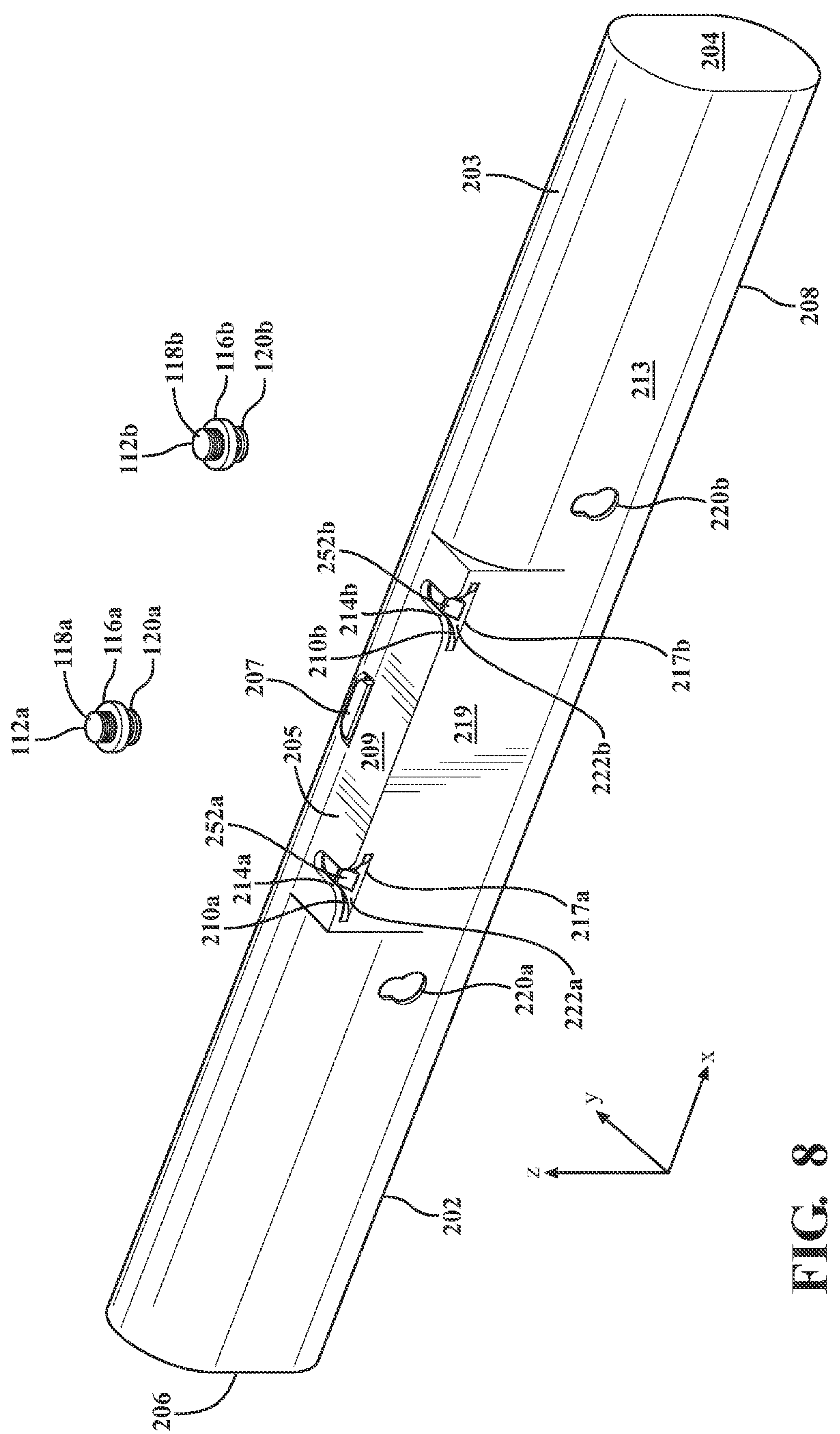
FIG. 8 is a rear perspective view of the soundbar of FIG. 7.

Another exemplary soundbar 200 is shown in FIGS. 7-8. Soundbar 200 is identical to soundbar 200 of FIGS. 1-6C in many respects, and like components have like reference numerals. Grooves 210*a* and 210*b* are structured like those in FIGS. 1-6C, but recesses 238*a* and 238*b* have been excluded. In FIG. 7 a button 207 protruding through upper surface 203 of soundbar housing 202 is operatively connected to an elongated (along the soundbar housing length (x) axis) member having two ends with L-shaped cross-sections. FIGS. 9B and 9C are cross-sectional views of soundbar 200 taken along the line B-B in FIG. 9A. In FIGS. 9B and 9C the upper threaded portions 118*a*, 118*b* and central flange portions 116*a*, 116*b* of fasteners 112*a*, 112*b* have been removed for ease of viewing.

FIG. 9A shows soundbar 200 attached to TV 100 in a locked condition. TV 100 is not shown for ease of viewing, and upper threaded portions 118*a*, 118*b* of fasteners 112*a*, 112*b* have also been reviewed for ease of viewing. Unlike FIGS. 1-6C, soundbar 200 of FIGS. 7-11B is not restrained vertically by a biased lock but is retrained horizontally by it. Biased lock 259*a* (reference numeral not shown in figures) comprises L-shaped locking member 252*a* and spring 260*a*. L-shaped locking member 252*a* comprises vertical section 256*a*, horizontal section 258*a*, and lip 261*a*. Lip 261*a* comprises first detent engagement surface 262*a* and second detent engagement surface 264*a* and projects vertically upward and away from horizontal section 258*a* in a direction along the soundbar housing height (z) axis. The vertical section 256*a* is operatively connected to button 207 so that depressing button 207 along the soundbar housing height (z) axis also depresses vertical section 256*a* and horizontal section 258*a* along the soundbar housing height (z) axis. Spring 260*a* biases L-shaped locking member 252*a* vertically upward along the soundbar housing height (z) axis. However, the L-shaped locking member 252*a* is restrained in the vertically upward direction by the floor 222*a* of groove 210*a*. L-shaped locking member 252*a* and spring 260*a* are contained in an internal housing that defines a chamber 263*a* beneath the groove floor 222*a*. In the locked condition of FIG. 9B, the L-shaped member horizontal section 258*a* abuttingly engages the underside of groove floor 222*a* due to the biasing action of spring 260*a*. Lip 261*a* projects above the groove floor 222*a* and restrains the horizontal movement of the soundbar 200 in a direction from the rear 130 of TV 100 toward display 110 of TV 100 along the TV thickness (y) axis because of its engagement with detent 120*a*. The other biased lock 259*b* is structured and operates the same way.

FIG. 9C shows the biased lock 259*a* part way through an uninstallation operation. In FIG. 9C, button 207 has been depressed, which moves L-shaped locking member 252*a* downward along the soundbar housing height (z) axis relative to soundbar housing 202 and against the biasing force of spring 260*a*. The button 207 has been depressed far enough to remove lip 261*a* of L-shaped locking member 252*a* from the groove 210*a* so that detent 120*a* can move out of groove opening entry 217*a* by pulling the soundbar 200 from TV rear surface 130 toward display 110 in a direction along the TV thickness (y) axis).

Figures 10A, 10B:
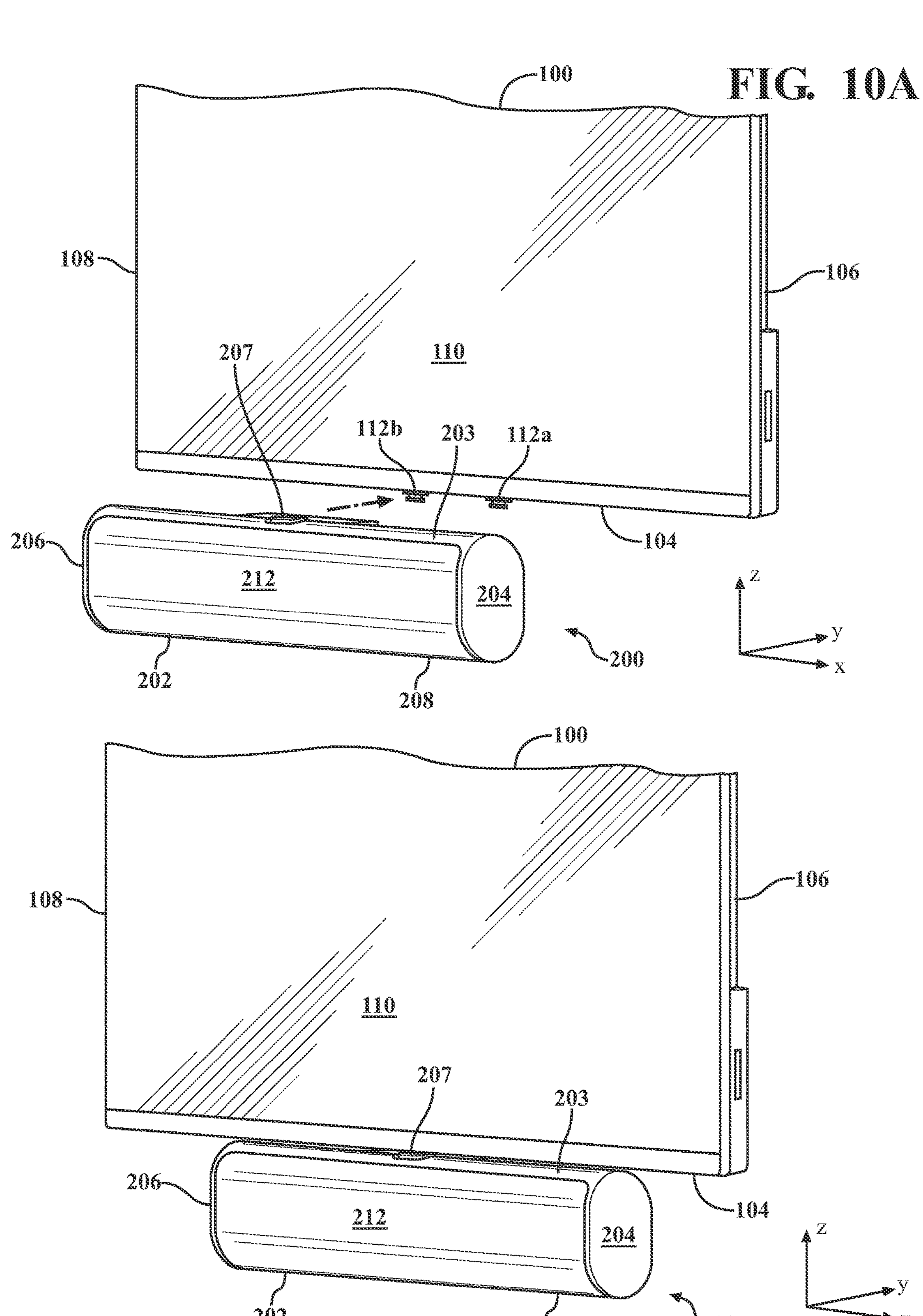
FIGS. 10A and 10B are perspective views of an audio-visual system comprising the soundbar of FIG. 7 and a flat screen TV during a soundbar installation operation.

FIGS. 10A-B depict an installation operation for soundbar 200 of FIGS. 7-11B. As shown in FIG. 10A, soundbar 200 is aligned with fasteners 112*a* and 112*b* positioned in respective grooves 210*a* and 210*b* so that the fastener detents 120*a* and 120*b* engage their respective groove floors 222*a* and 222*b*. As soundbar 200 is pushed in a direction from TV display 110 toward TV rear surface 130, detents 120*a* and 120*b* of fasteners 112*a* and 112*b* engage respective first detent engagement surfaces 262*a* and 262*b* of L-shaped locking members 252*a* and 252*b*. When viewed along the soundbar housing length (x) axis, first detent engagement surfaces 262*a* and 262*b* slope upwards in the y-z plane when moving from rear TV surface 130 toward display 110. As a result, the continued engagement of detents 120*a* and 120*b* with their respective first detent engagement surfaces 262*a* and 262*b* causes the L-shaped locking members 252*a* and 252*b* to be progressively pushed vertically downward along the soundbar housing height (z) axis, with the maximum depression occurring when detents 120*a* and 120*b* engage respective second detent engagement surfaces 264*a* and 264*b*. As detents 120*a* and 120*b* pass lips 261*a* and 261*b*, the biasing force of springs 260*a* and 260*b* will push L-shaped locking members 252*a* and 252*b* into engagement with the undersides of their respective groove floors 222*a* and 222*b*. Soundbar 200 is restrained from moving downward by the engagement of detents 120*a* and 120*b* with downward facing surfaces 215*a*, 215*b* of upper groove walls 214*a* and 214*b* and is restrained from moving horizontally by lips 261*a* and 261*b* of locking members 252*a* and 252*b*. Unlike the embodiment of FIGS. 1-6C, in the embodiment of FIGS. 7-11B, the lips 261*a* and 261*b* project the same distance above groove floors 222*a* and 222*b* when the soundbar 200 is in either the locked or unlocked condition because the L-shaped locking members 252*a*, 252*b* abuttingly engage the underside of groove floors 222*a*, 222*b*, respectively, in both the locked and unlocked conditions.

Figures 11A, 11B:
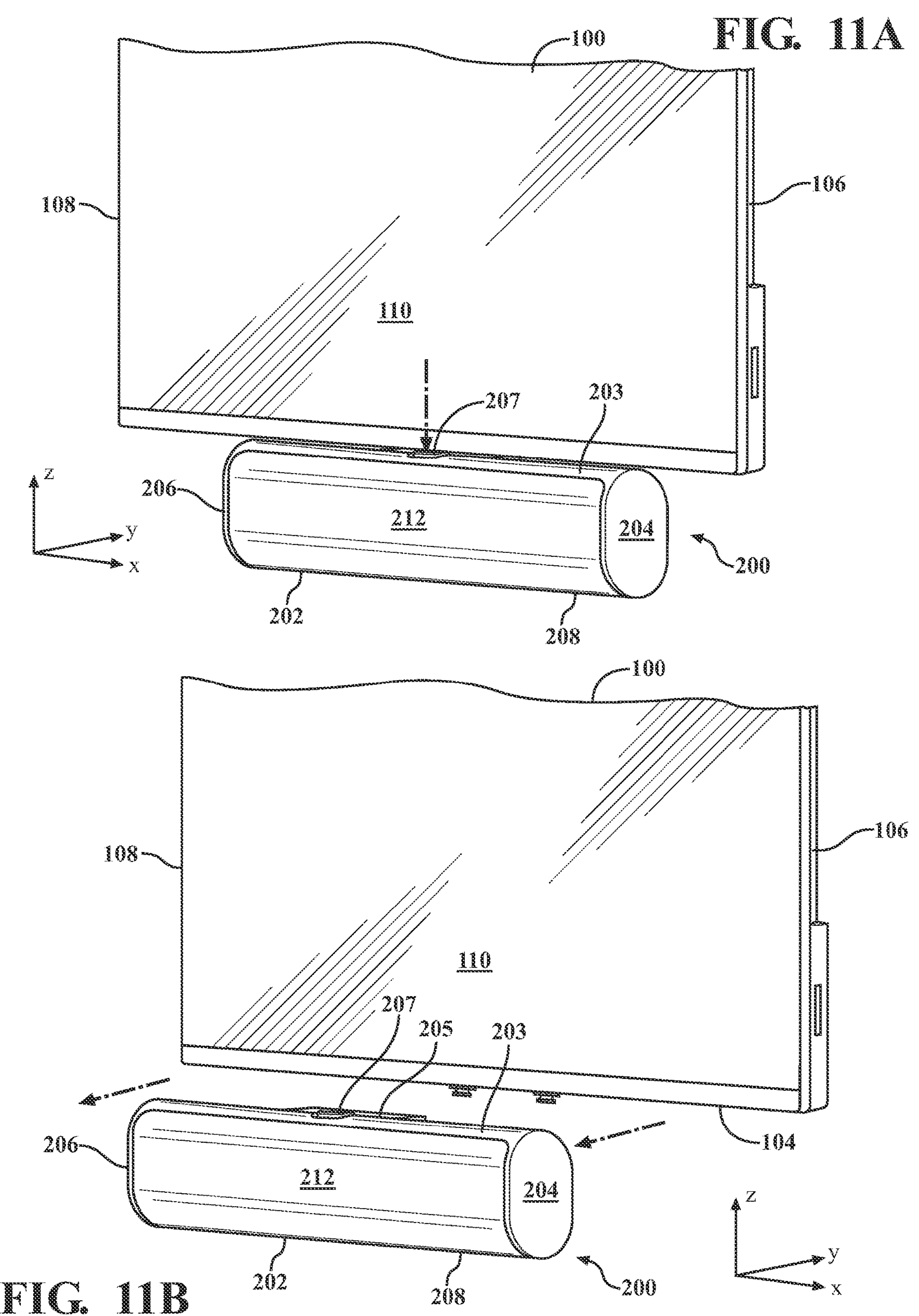
FIGS. 11A and 11B are perspective views of an audio-visual system comprising the soundbar of FIG. 7 and a flat screen TV during a soundbar uninstallation operation.
Figure 12:
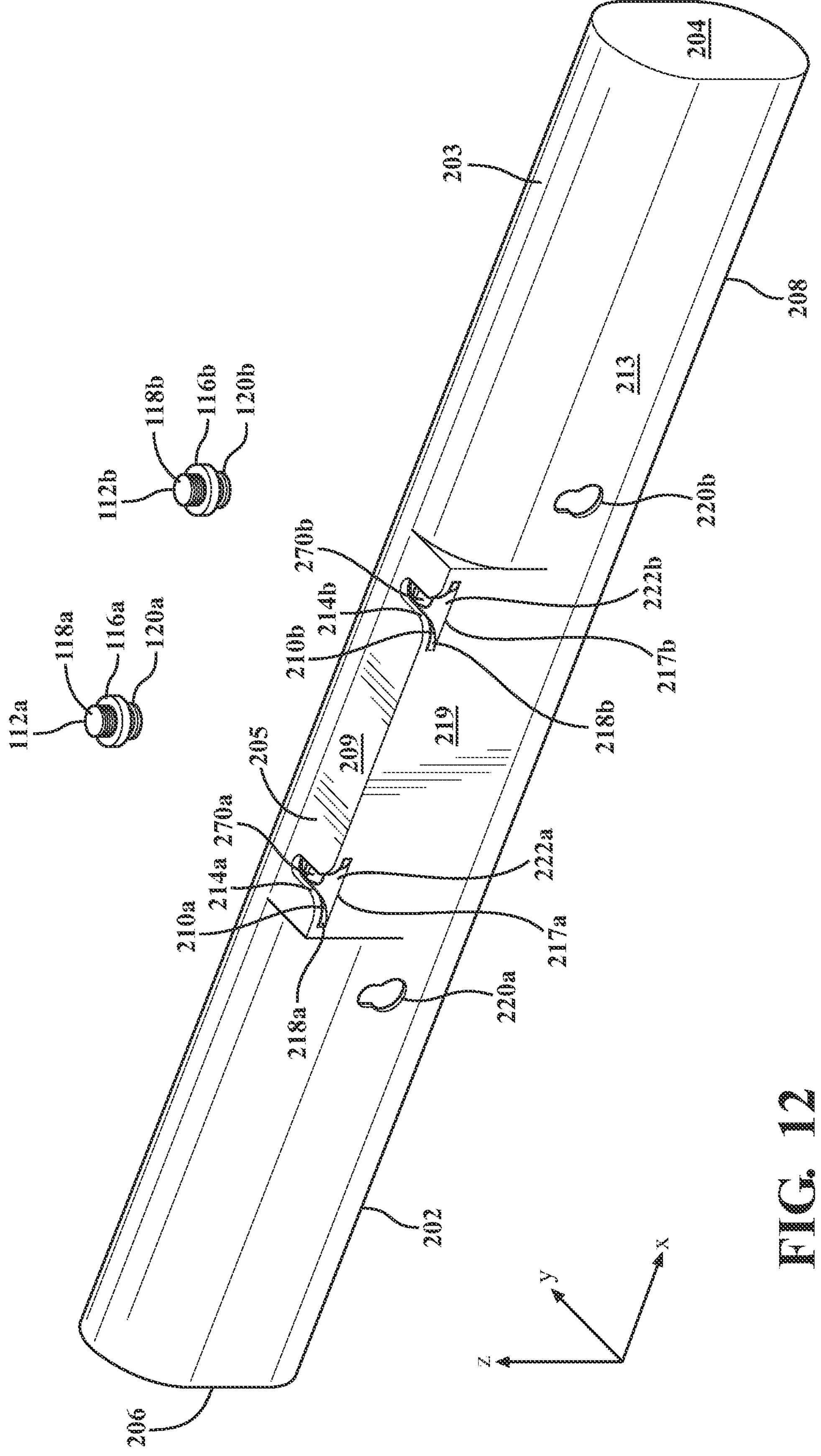
FIG. 12 is a rear perspective view of a soundbar configured for installation on a flat-screen TV in accordance with a third embodiment of an audio-visual system of the present disclosure.
Figures 13A, 13B, 13C:
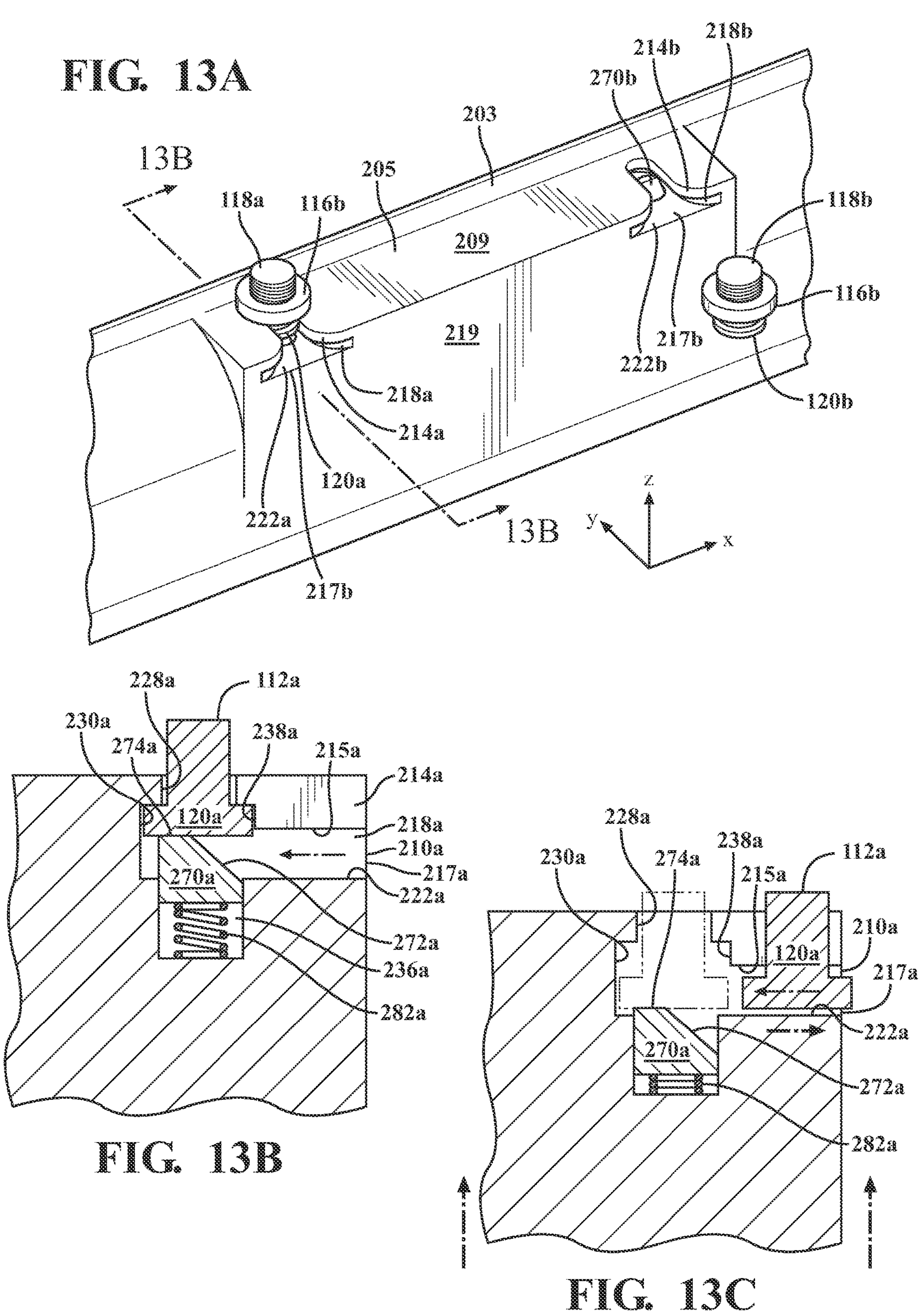
FIG. 13A is a close-up perspective view of a central rear section of the soundbar of FIG. 12.
FIGS. 13B and 13C are cross-sectional views of the biased lock of the soundbar of FIG. 12 showing the biased lock in a locked condition and immediately following the completion of an unlocking operation, respectively.

Referring to FIGS. 11A-B, to uninstall soundbar 200 of FIGS. 7-11B, button 207 is depressed to pull lips 261*a* and 261*b* of locking members 252*a* and 252*b* below groove floors 222*a* and 222*b*. Soundbar 200 is then pulled in a direction from TV rear surface 130 toward TV display 110 along the TV thickness (y) axis until detents 120*a* and 120*b* exit the groove entry openings 217*a* and 217*b*.

Referring to FIGS. 12-15B, a third embodiment of a soundbar 200 is described. Soundbar 200 is designed substantially the same way as soundbar 200 of FIGS. 1-6C, except that polygonal locking member 270*a* is proportioned somewhat differently than that of FIGS. 1-6C, and chamber 286*a* that houses spring 282*a* is sized differently. In the embodiment of FIGS. 12-15B, biased locks 269*a* and 269*b* (reference numerals not shown in figures) comprise polygonal locking member 270*a* and 270*b* and springs 282*a* and 282*b*, respectively. The biased locks 269*a*, 269*b* are identical in design. FIGS. 13B and 13C show biased lock 269*a*. Upper threaded portions 118*a*, 118*b* and central flanges 116*a*, 116*b* of fasteners 112*a*, 112*b* have been removed for ease of viewing. Polygonal locking member 270*a* includes a first detent engagement surface 272*a* and a second detent engagement surface 274*a*. First detent engagement surface 272*a* slopes upward in the y-z plane when viewed along the soundbar housing length (x) axis and moving from rear TV surface 130 toward display 110 along the soundbar housing thickness (y) axis. Thus, when the soundbar 200 moves in a direction from TV display 110 toward TV rear surface 130 along the TV thickness (y) axis, as detent 120*a* progressively engages first detent engagement surface 272*a*, polygonal locking member 270*a* is progressively depressed vertically downward along the TV height (z) axis. In FIG. 13B soundbar 200 is in a locked condition and attached to the bottom surface 104 of TV 100. In the locked condition, detent 120*a* is seated in recess 238*a* formed in upper groove wall 214*a* and is restrained from downward vertical movement along the TV height (z) axis and in the TV width (x) and thickness (y) plane. In the locked condition, polygonal locking member 270*a* projects above groove floor 222*a* into the recess defined by groove floor 222*a* and groove walls 214*a* and 218*a*. In FIG. 13C the fastener 112*a* shown in phantom illustrates the soundbar 200 having been pushed upward along soundbar housing height (z) axis relative to TV 100, in which case the polygonal locking member 270*a* is depressed beneath groove floor 222*a* so that detent 120*a* is not restrained within recess 238*a* and soundbar 200 can be moved in a horizontal direction from rear TV surface 130 toward TV display 110 along the TV thickness (y) and exit groove 210*a* via groove entry opening 217*a*.

Figures 14A, 14B:
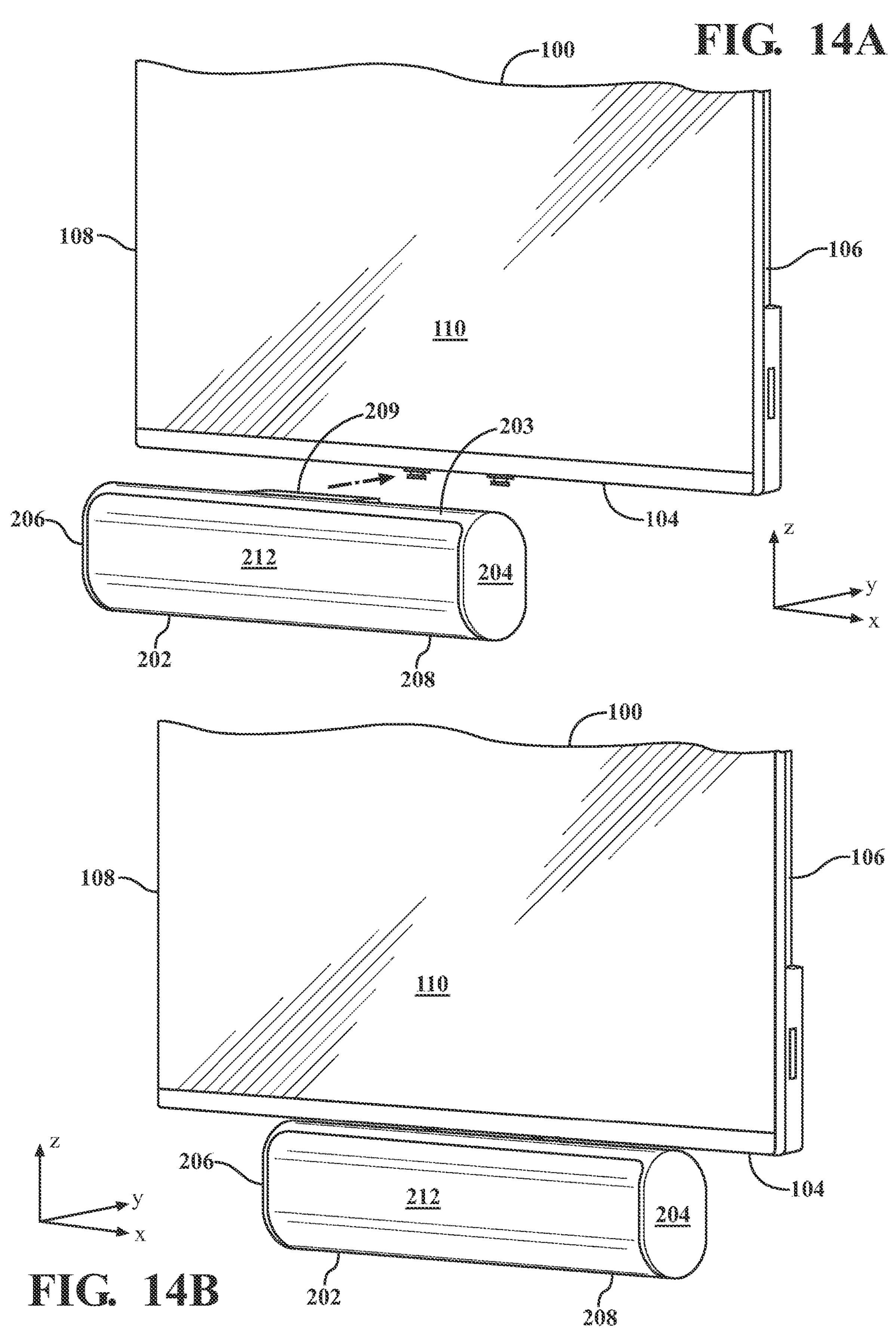
FIGS. 14A and 14B are perspective views of an audio-visual system comprising the soundbar of FIG. 12 and a flat screen TV during a soundbar installation operation.

FIGS. 14A and 14B depict an installation operation for soundbar 200 of FIGS. 12-16B. In FIG. 14A fasteners 112*a* and 112*b* are aligned with groove entry openings 217*a* and 217*b* and then engage groove floors 222*a* and 222*b*, respectively. As soundbar 200 is pushed in a direction from TV display 110 toward TV rear surface 130 along the TV thickness (y) axis, the engagement of fastener detents 120*a* and 120*b* and first detent engagement surfaces 272*a* and 272*b* moves the polygonal locking members 270*a* and 270*b* vertically downward beneath groove floors 222*a* and 222*b*. Once detents 120*a* and 120*b* reach the respective ends 230*a*, 230*b* of lower groove walls 218*a*, 218*b*, they disengage from their respective first detent engagement surfaces 272*a*, 272*b*, The soundbar 200 is then released, and springs 282*a* and 282*b* apply a biasing force against respective fasteners 112*a* and 112*b*, which causes soundbar housing 202 to move vertically downward along the soundbar housing height (z) axis until detents 120*a* and 120*b* are seated in respective recesses 238*a* and 238*b* formed in the downward facing surfaces 215*a* and 215*b* of upper groove walls 214*a* and 214*b*.

Figures 15A, 15B:
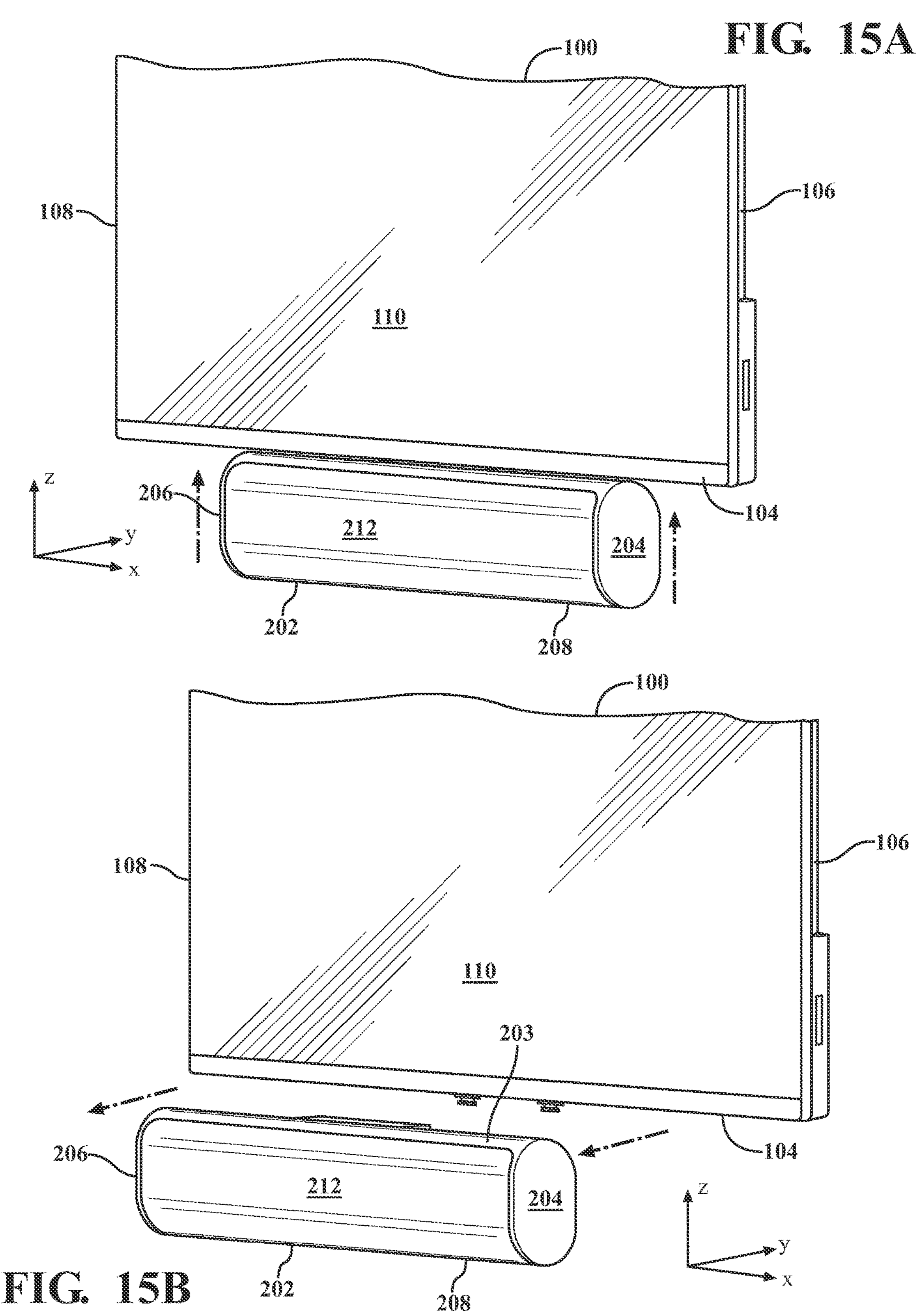
FIGS. 15A and 15B are perspective views of an audio-visual system comprising the soundbar of FIG. 12 and a flat screen TV during a soundbar uninstallation operation.
Figure 16:
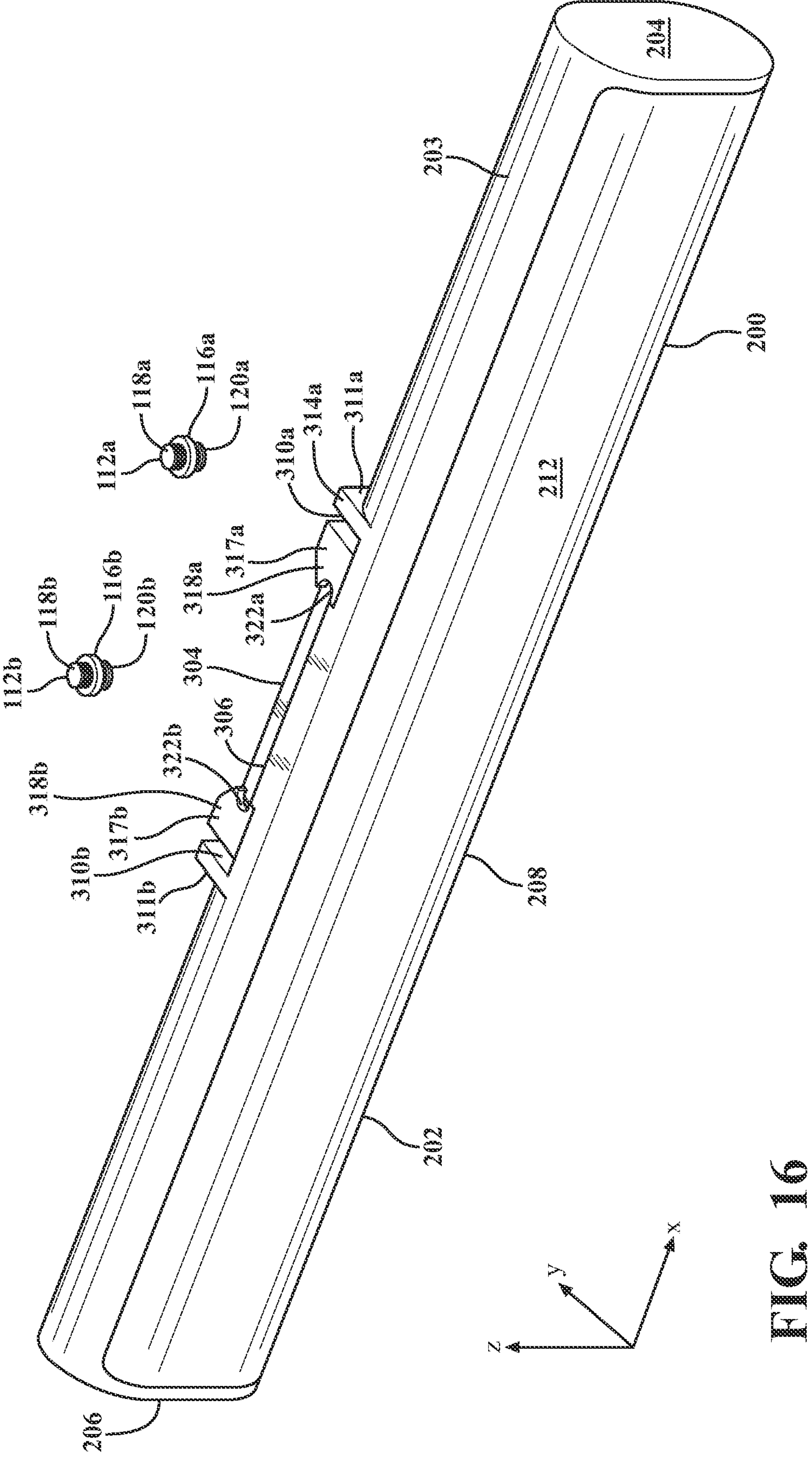
FIG. 16 is a front perspective view of a soundbar configured for installation on a flat-screen TV in accordance with a fourth embodiment of an audio-visual system of the present disclosure.
Figure 17:
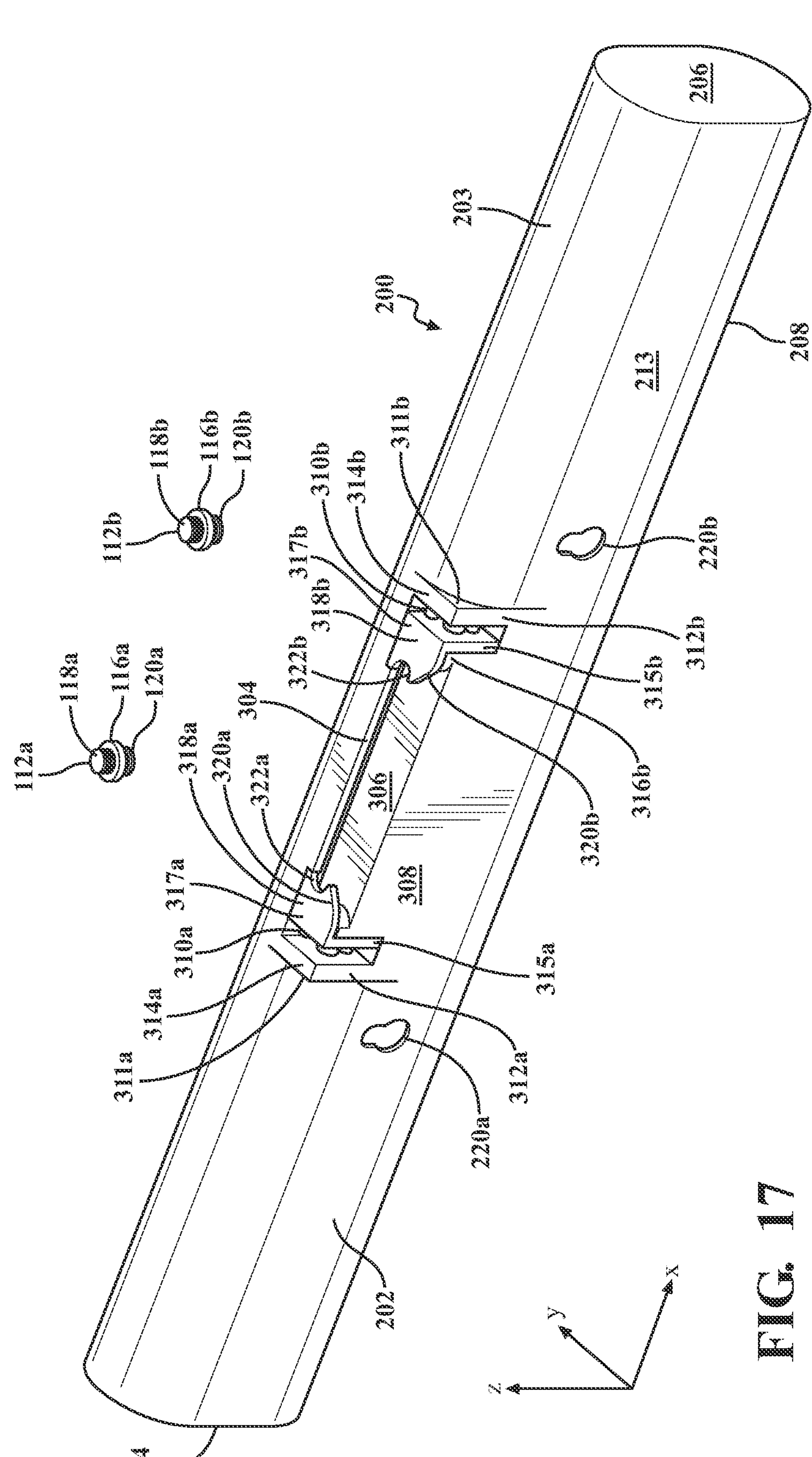
FIG. 17 is a rear perspective view of the soundbar of FIG. 16.

FIGS. 15A and 15B depict an uninstallation operation for soundbar 200 of FIGS. 12-15B. Soundbar 200 is pushed vertically upward along the soundbar housing height (z) axis so that detents 120*a* and 120*b* push polygonal locking members 270*a* and 270*b* beneath groove floors 222*a* and 222*b*, respectively. Soundbar 200 is then pulled in a direction from rear TV surface 130 toward TV display 110 along the TV thickness (y) axis until detents 120*a* and 120*b* exit respective grooves 210*a* and 210*b* via respective groove entry openings 217*a* and 217*b*. In the embodiment of FIGS. 12-15B, polygonal locking members 270*a*, 270*b* project above respective groove floors 222*a*, 222*b* and into grooves 210*a*, 210*b* by a greater among when soundbar 200 is in the unlocked condition than in the locked condition, because in the locked condition, polygonal locking members 270*a*, 270*b* engage detents 120*a*, 120*b*.

Referring to FIGS. 16-20B, a fourth embodiment of a soundbar 200 is depicted. Soundbar 200 is the same as in the previous embodiments except that the central rear housing and biased locks are structured differently. In FIGS. 16-20B the biased locks comprise clamps 317*a* and 317*b*, which face each other along the soundbar housing length (x) axis and are minor images of one another, and their respective springs (not shown). Fastener detents 120*a* and 120*b* displace the clamps 317*a* and 317*b* away from one another along the soundbar housing length (x) axis during an installation operation instead of displacing them vertically downward as in the previous embodiments.

Central rear housing 304 is generally rectangular and comprises a top horizontal panel 306 connected to vertical panel 308. The end panels 311*a* and 311*b* of the central rear housing 304 are also generally rectangular and comprise respective horizontal 314*a*, 314*b* and vertical 312*a*, 312*b* surfaces. End panels 311*a*, 311*b* are spaced apart from one another along the soundbar housing length (x) axis. The clamps 317*a* and 317*b* each comprise a horizontal panel 318*a*, 318*b* and a vertical panel 315*a*, 315*b*. Although not visible in the figures, there is a central vertical wall that separates the interior of central rear housing 304 into two sections, one on the right and one on the left. Each section includes a spring (not shown) that is attached to a respective side of the central wall and which engages one side of the vertical panels 315*a*, 315*b* that define clamps 317*a*, 317*b*. The springs are tension springs that bias the clamps 317*a* and 317*b* toward each other and toward a mid-point along the soundbar housing length (x) axis. Spaces 310*a* and 310*b* are provided between each clamp 317*a* and 317*b* and its respective end panel 311*a*, 311*b*. Spaces 310*a*, and 310*b* allow the clamps 317*a*, 317*b* to be displaced away from one another when sufficient forces are applied to overcome the biasing force of their respective biasing springs.

Figures 18A, 18B, 18C:
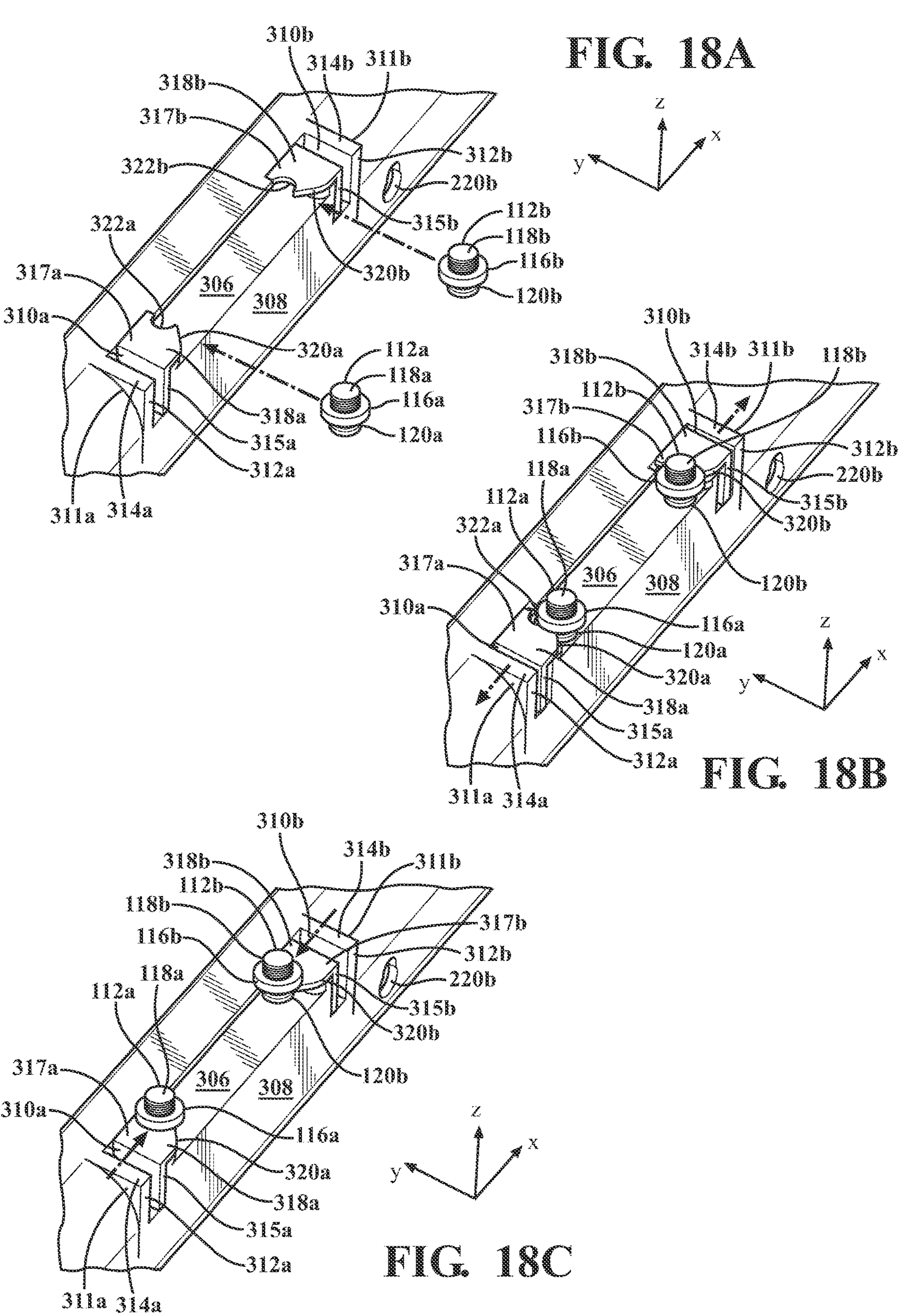
FIGS. 18A-18C are perspective views of the soundbar of FIG. 16 and fasteners used to attach the soundbar to a flat-screen TV during a soundbar installation operation.

As shown in FIG. 18A, during an installation operation soundbar 200 positioned so that fastener detents 120*a* and 120*b* are respectively aligned with clamps 317*a* and 317*b*, and more specifically, detents 120*a* and 120*b* are aligned with first detent engagement surfaces 320*a* and 320*b* of clamps 317*a* and 317*b*. As the soundbar is pushed along the TV thickness (y) axis in a direction from display 110 toward TV rear surface 130, detents 120*a* and 120*b* will engage first detent engagement surfaces 320*a* and 320*b*. When viewed along the soundbar housing height (z) axis, first detent engagement surfaces 320*a* and 320*b* slope toward front housing surface 212 when moving in a direction from the clamps 317*a* and 317*b* toward the lengthwise (x) center of soundbar 200. As a result, and as shown in FIG. 18B, as the soundbar 200 is progressively pushed from the display 110 toward the TV rear surface 130 along the TV thickness (y) axis, clamps 317*a* and 317*b* are progressively displaced away from one another along the soundbar housing length (x) axis. As shown in FIG. 18C, once the detents 120*a* and 120*b* reach second detent engagement surfaces 322*a* and 322*b*, soundbar 200 is in its locked condition, and the detents 120*a* and 120*b* will be seated in second detent engagement surfaces 322*a* and 322*b* and in similarly shaped retaining surfaces 316*a* and 316*b* formed on horizontal panel 306 of central rear housing 304 (see FIGS. 19B-C). The biasing force of the springs attached to each clamp 317*a*, 317*b* pulls the clamps 317*a* and 317*b* toward one another along the soundbar housing length (x) axis to restrain the movement of the soundbar along the soundbar housing length (x) axis.

The shape of retaining surfaces 316*a*, 316*b* and second detent engagement surfaces 322*a*, 322*b* restrains the movement of soundbar 200 along the soundbar housing thickness (y) axis relative to TV 100. In the soundbar's 200 locked condition, a portion of detents 120*a* and 120*b* will be positioned under the horizontal panels 318*a*, 318*b* of clamps 317*a*, 317*b*, which restrains the vertically downward movement of soundbar housing 202 along the TV height (z) axis relative to TV 100. The engagement of central flanges 116*a*, 116*b* with the upper surfaces of respective clamp horizontal panels 318*a*, 318*b* restrains the vertically upward movement of soundbar 200 relative to TV 100.

Figures 19A, 19B, 19C:
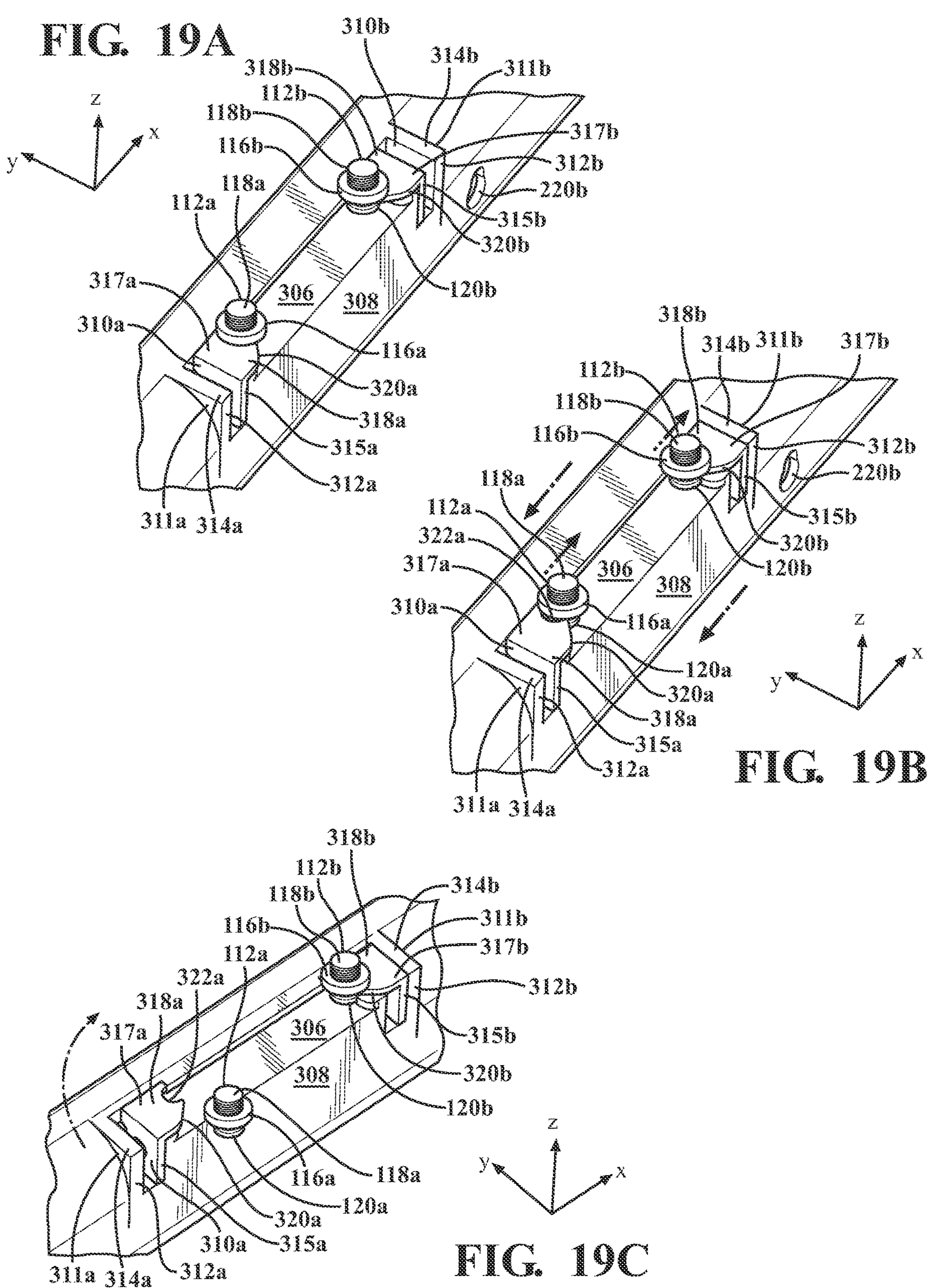
FIGS. 19A-19C are perspective views of the soundbar of FIG. 16 and fasteners used to attach the soundbar to a flat-screen TV during a soundbar uninstallation operation
Figures 20A, 20B:
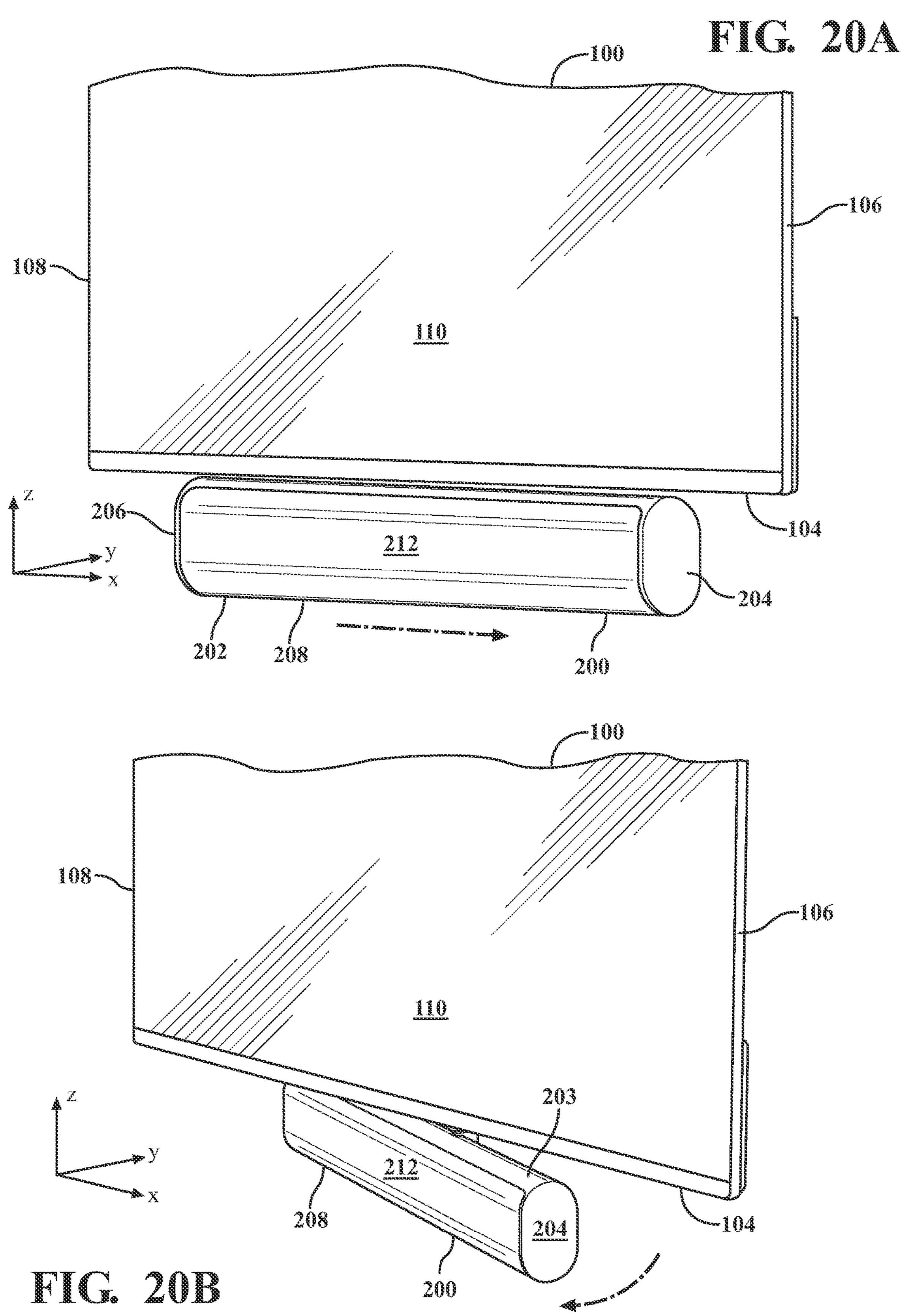
FIGS. 20A-20B are front perspective views of an audio-visual system comprising the soundbar of FIG. 16 during an uninstallation operation.
Figure 21:
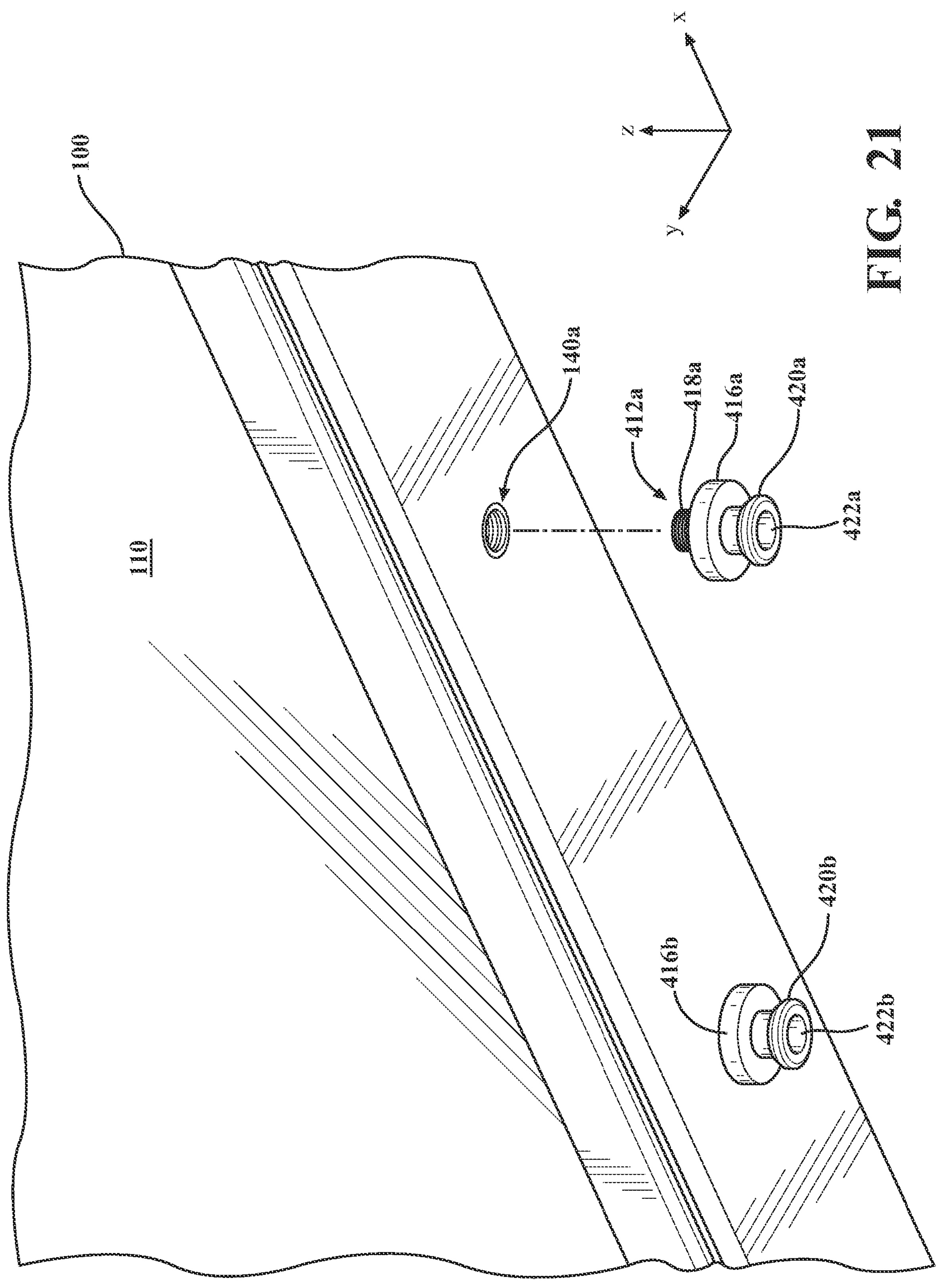
FIG. 21 is a close-up perspective view of a the bottom of a flat-screen TV configured for attachment of a soundbar in accordance with a fifth embodiment of the present disclosure.
Figure 22:
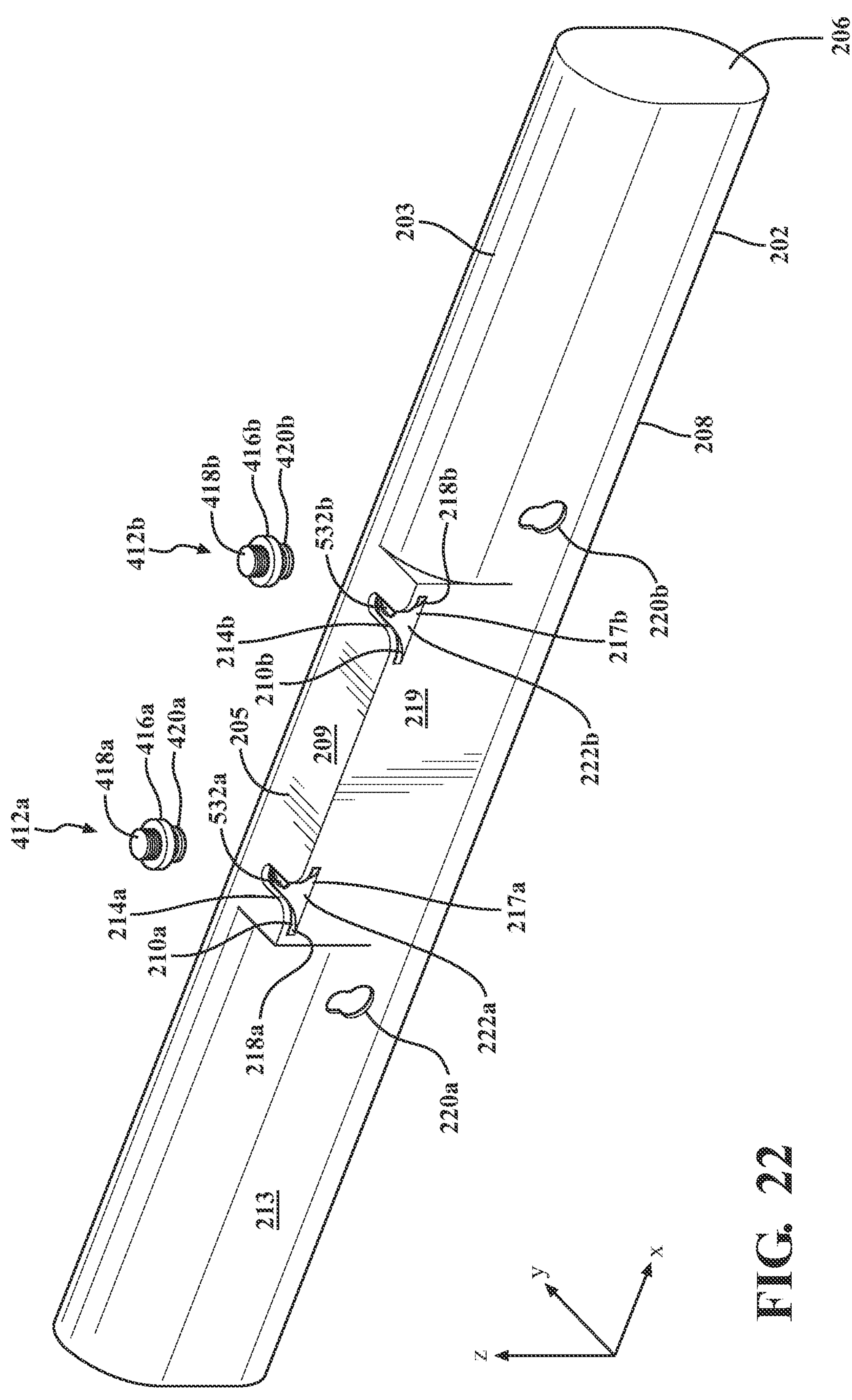
FIG. 22 is a rear perspective view of a soundbar configured for attachment to the flat-screen TV of FIG. 21.
Figures 24A, 24B:
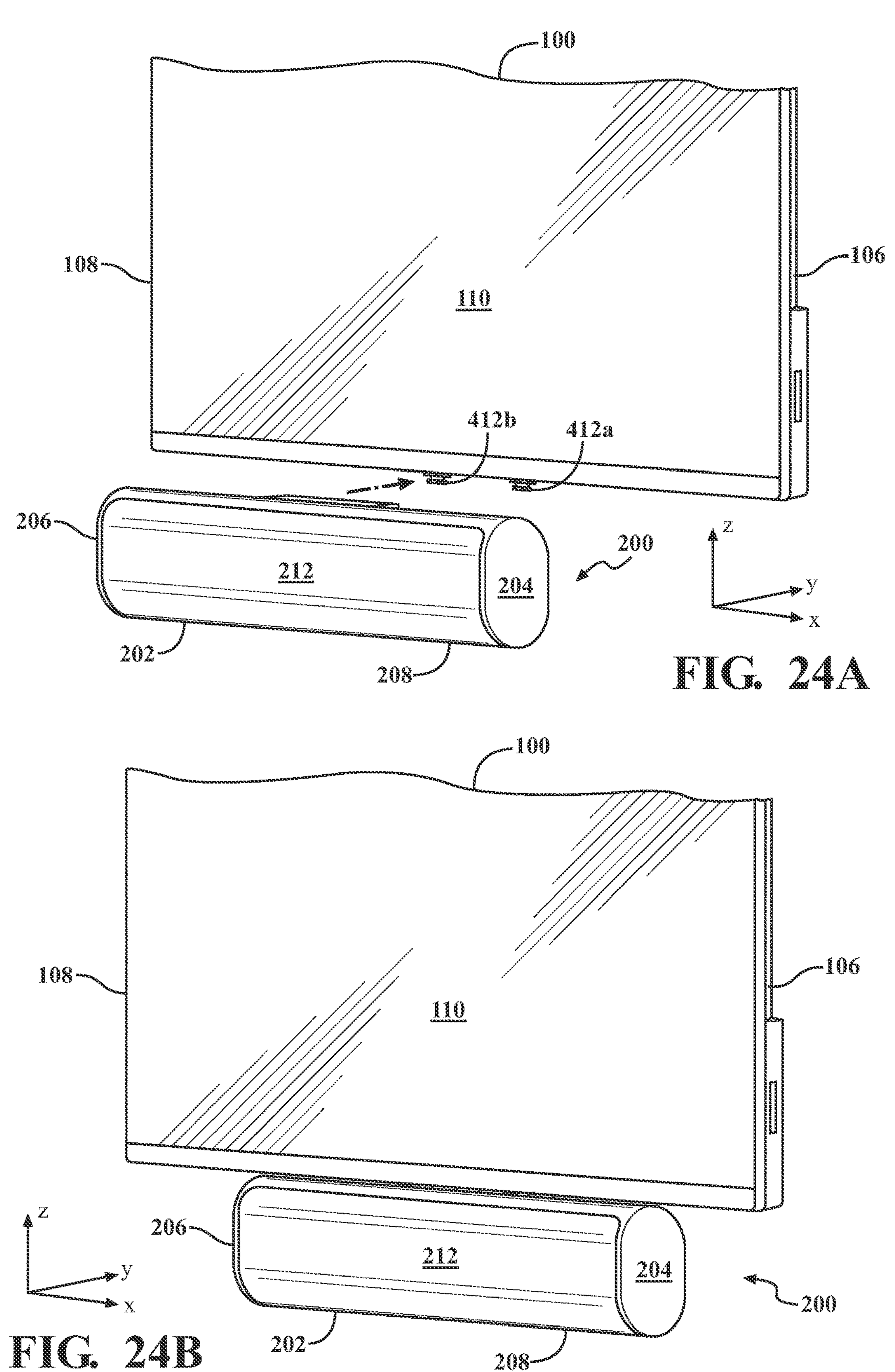
FIGS. 24A-24B perspective views of an audio-visual system comprising the soundbar of FIG. 22 during a soundbar installation operation.

An uninstallation operation is depicted in FIGS. 19A-20B. In FIG. 19A soundbar 200 is in its locked condition. As shown in FIGS. 19B, soundbar 200 is displaced along the TV width (x) axis in either direction to release one of the clamps 317*a*, 317*b*. In FIG. 19B soundbar 200 is displaced in a direction from fastener 112*b* toward fastener 112*a*, which moves clamp 317*b* into abutting engagement with central rear housing end panel 311*b* and pulls clamp 317*a* away from fastener 112*a*. Soundbar 200 is then rotated about fastener 112*b* in a direction that is clockwise when viewed from above to fully disengage fastener 112*a* and clamp 317*a*. At that point, soundbar 200 may be laterally displaced in a direction from fastener 112*a* toward fastener 112*b* to disengage clamp 317*b* and fastener 112*b*.

Referring to FIGS. 22-25, another example of a soundbar 200 is depicted. Soundbar housing 202 is substantially identical to soundbar housing 202 of FIGS. 12-15B. However, in this example, the locking member is a solid sphere or ball 532*a*. Thus, the fasteners 412*a* and 412*b* are shaped differently than in the previous examples. Fastener 412*a* has an upper threaded portion 418*a* that threading engages hole 140*a* in the bottom surface of TV 100, a central flange 416*a*, and a detent 420*a* that has an opening 422*a* sized and shaped to engage a ball-shaped locking member 532*a*. Fastener 412*b* has corresponding features and is spaced apart from fastener 412*a* along the TV width (x) axis.

When soundbar 200 is in an unlocked condition, ball-shaped locking members 532*a*, 532*b* project above groove floors 222*a*, 222*b*. Referring to FIGS. 23A-C and 24, during an installation operation, fasteners 412*a* and 412*b* are aligned with respective soundbar installation grooves 210*a*, 210*b* so that detents 420*a*, 420*b* engage groove floors 222*a*, 222*b*, respectively. Soundbar 200 is then pushed in a direction from display 110 toward TV rear surface 130 along the TV thickness (y) axis. As soundbar 200 is pushed in this direction, detent 420*a* engages a first detent engagement portion 704*a* of ball locking member 532*a*. Due to the curved nature of the ball-shaped locking member 532*a*, as detent 120*a* applies a force against first detent engagement portion 704*a*, a component of the force is generated in the vertically downward direction along the soundbar housing height (z) axis, thereby pushing ball-shaped locking member 532*a* in the same direction against the biasing force of biasing spring 282*a*. When detent 120*a* reaches the end of the groove it engages end 230*a* of lower groove wall 218*a* which prevents further movement of the detent 120*a* within groove 210*a*. Soundbar 200 is then released, causing the ball-shaped locking member 532*a* to apply a biasing force to fastener 412*a* vertically upward along the soundbar housing height (z) axis so that detent 420*a* engages downward facing surface 215*a* of upper groove wall 214*a*, which restrains the vertically downward movement of soundbar housing 202 relative to TV 100 along the soundbar housing height (z) axis. At this point, ball-shaped locking member 532*a* is seated in opening 422*a* of fastener 412*a* as shown in FIG. 23B. Ball-shaped locking member 532*b* and its corresponding spring 282*b* cooperate in the same fashion with fastener detent 420*b*.

Figure 25:
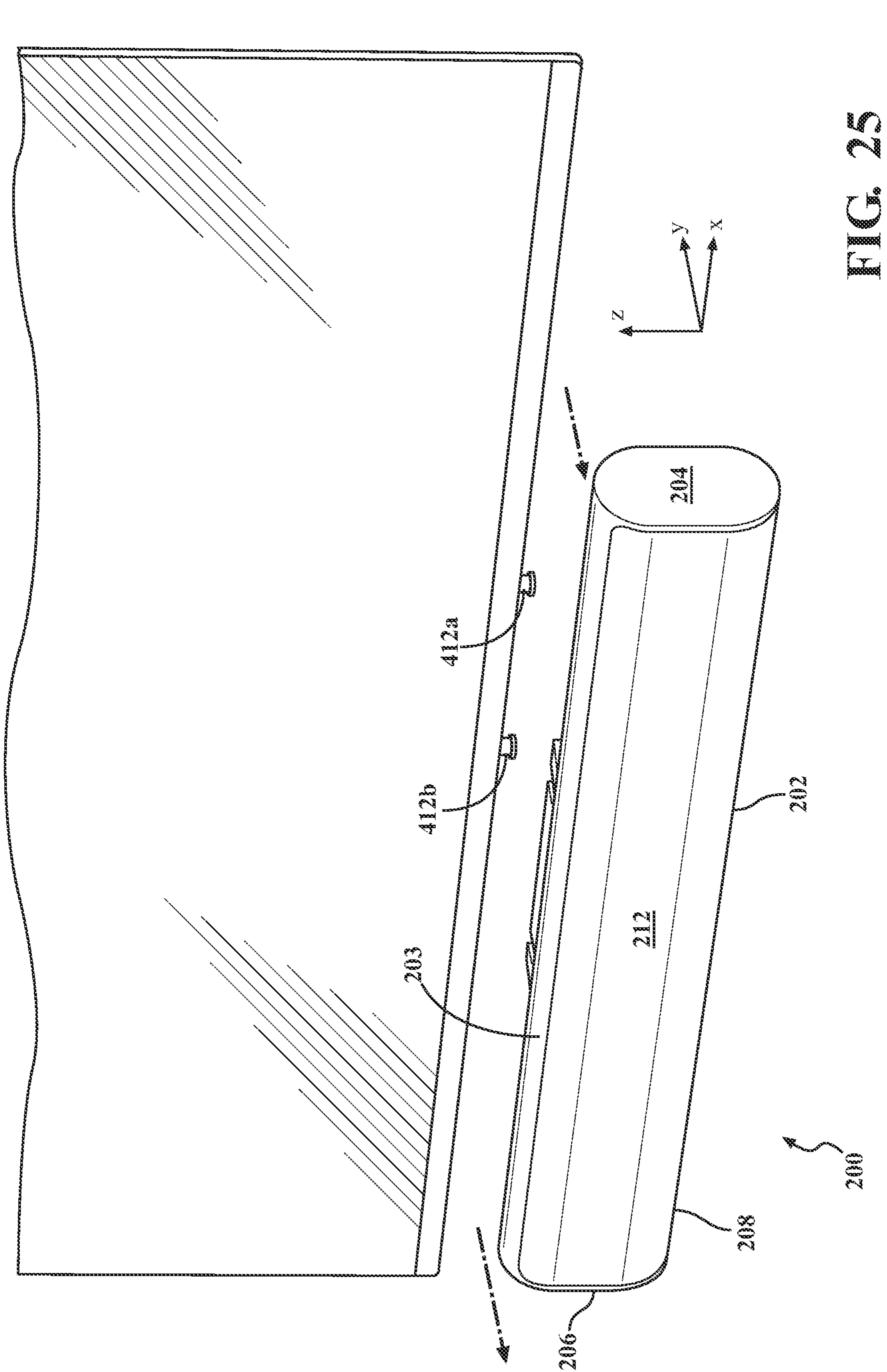
FIG. 25 is a perspective view of the audio-visual system of FIGS. 24A-24B following a soundbar uninstallation operation.

To uninstall soundbar 200 of FIGS. 22-25 from TV 100, soundbar 200 is first pushed in an upward direction toward the bottom surface 104 of TV 100 along the soundbar housing height (z) axis and TV height (z) axis, which pushes the ball-shaped locking member 532*a* below the groove floor 222*a*. As shown in FIG. 25, while keeping it pushed upward, the soundbar 200 is pulled in a direction from rear TV surface 130 toward display 110 along the soundbar housing thickness (y) axis until fasteners 412*a* and 412*b* exit their respective groove entry openings 217*a* and 217*b*. Once the fasteners clear the ball-shaped locking members 532*a*, 532*b*, the ball-shaped locking members 532*a*, 532*b* will again project above groove floors 222*a*, 222*b* due to the biasing action of springs 232*a*, 232*b*. In the embodiment of FIGS. 22-25, ball-shaped locking members 532*a*, 532*b* project above respective groove floors 222*a*, 222*b* and into grooves 210*a*, 210*b* by a greater distance in the unlocked condition than in the locked condition due to the engagement of ball-shaped locking members 532*a*, 532*b* with respective detents 420*a*, 420*b* when soundbar 200 is in the locked condition.

It should be noted that instead of providing the biased locks as part of the soundbar and putting the fasteners with detents on the video monitor to which the soundbar is attached, the video monitor bottom surface may be provided with the soundbar installation grooves and biased locks, and fasteners may be attached to a horizontal surface of the soundbar.

Figure 28:
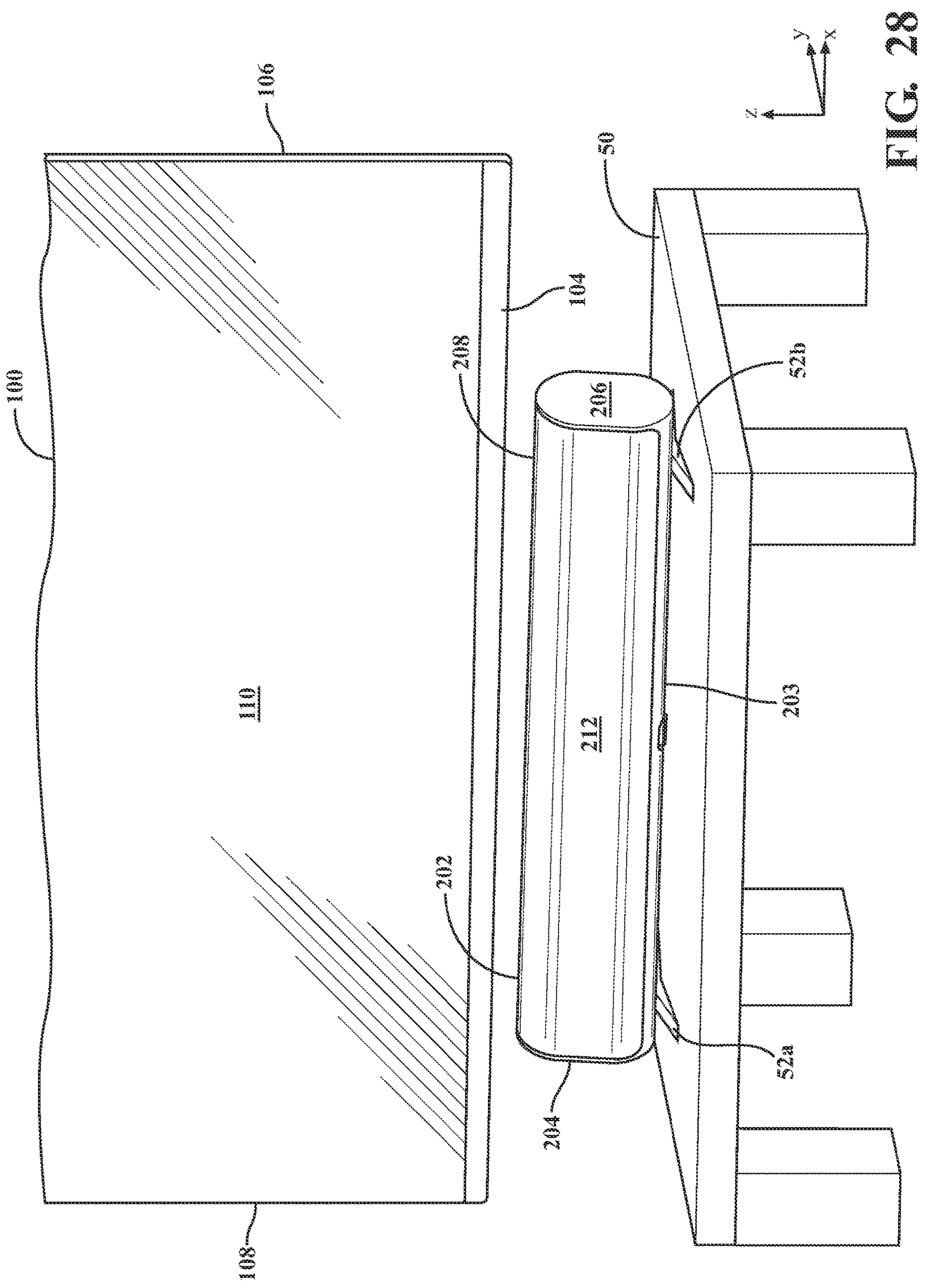
FIG. 28 is a diagram showing the soundbar of FIGS. 1-6C positioned in a "right side-up" configuration and resting on a tabletop.

In certain examples of soundbars in accordance with the present disclosure, the soundbar may be oriented with its horizontal surfaces in opposite positions relative to one another and the Earth. Referring to FIG. 28, soundbar 200 of FIGS. 1-6C is shown detached from TV 100 and resting on a tabletop 50 proximate TV 100. Brackets 52*a* and 52*b* are attached to horizontal surface 203 to provide stability. In FIG. 28 horizontal surface 203 is positioned closer to tabletop 50 than is horizontal surface 208 in order to conceal the soundbar installation grooves 210*a*, 210*b* and provide a more aesthetically pleasing appearance. Because FIGS. 1-6C show soundbar 200 in an "upside down" orientation, the right and left locations of soundbar housing sides 204 and 206 are reversed relative to FIG. 28. Therefore, content designated for the right channel in FIG. 28 will be played on the right speaker (which is closest to housing side 206), and content designated for the left channel in FIG. 28 will be played on the left speaker (which is closest to housing side 204). However, when soundbar 200 is inverted to the upside down orientation of FIGS. 1-6C, content designated for the left channel will be played on the right speaker and content designated for the right channel will be played on the left speaker, which may be undesirable and inconsistent with the intention of the content developer. Accordingly, in certain examples, the other soundbars described herein are configured to selectively connect each of two channels to one of two speakers in a manner that varies depending on whether the soundbar is in the right-side up orientation or the upside down orientation. Thus, when the soundbar 200 is in the right-side up orientation of FIG. 28, soundbar 200 selectively connects a first channel to a first of two speakers (e.g., a speaker proximate soundbar housing side 206), and a second channel to a second of two speakers (e.g., a speaker proximate soundbar housing side 204). However, when soundbar 200 is in the upside down orientation, soundbar 200 selectively connects the second channel to the first of the two speakers (e.g., the speaker proximate soundbar housing side 206) and the first channel to the second of the two speakers (e.g., the speaker proximate soundbar housing side 204).

Figure 26B:
FIG. 26B is a pin-out diagram of a combination accelerometer and gyroscope integrated circuit.
Figure 26B:
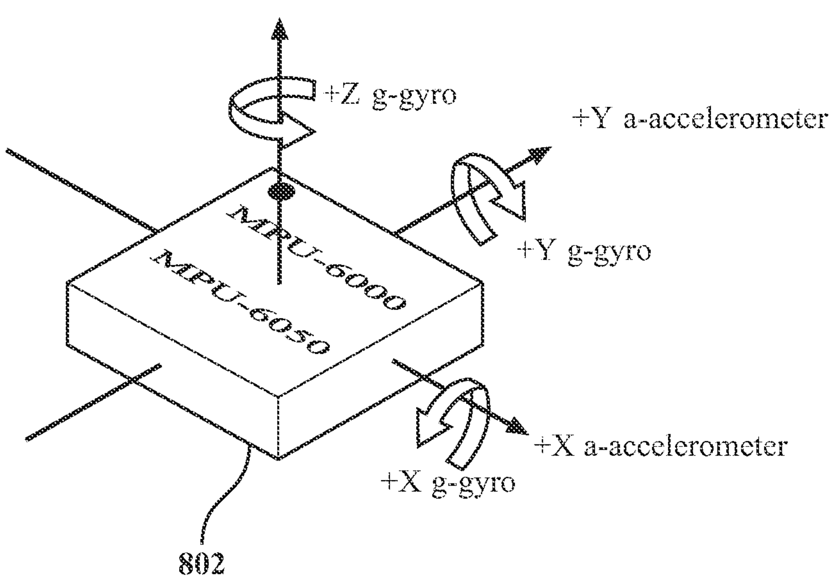
Figure 26B:
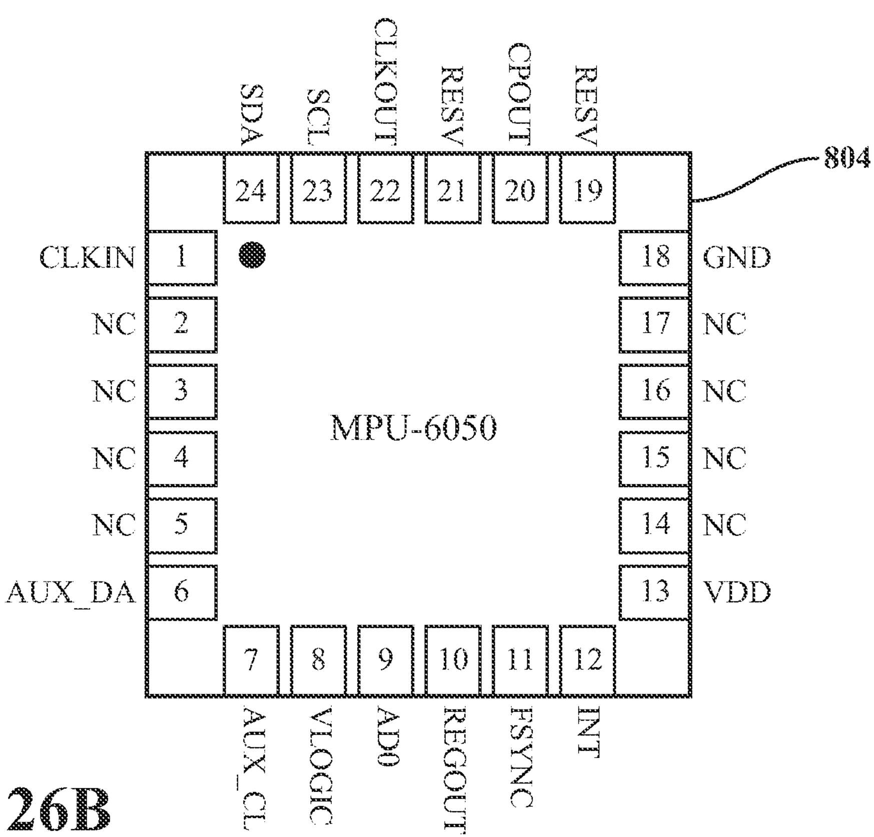

In accordance with examples in which right and left speakers are selectively and automatically connected with one of two channels depending on the soundbar orientation, an inertial sensor 802 is preferably provided and configured to determine whether horizontal wall 203 is vertically above or below horizontal surface 203 (and vice-versa). Examples of such inertial sensors include accelerometers and gyroscopes or a combination of both. In FIG. 26A, a perspective view of an inertial sensor 802 comprising a combined accelerometer/gyroscope is provided. In the example of FIG. 26A, sensor 802 is a semiconductor with three-axis sensitivity to acceleration and three-axis sensitivity to rotation (which detects the "Coriolis effect"). Thus, different signals are generated at the outputs of the sensor 802 depending on the positions of the soundbar housing horizontal surfaces 208 and 203 relative to the Earth (and one another). The pin-out diagram 804 of a typical inertial sensor that combines the features of an accelerometer and gyroscope is shown in FIG. 26B.

Figure 27:
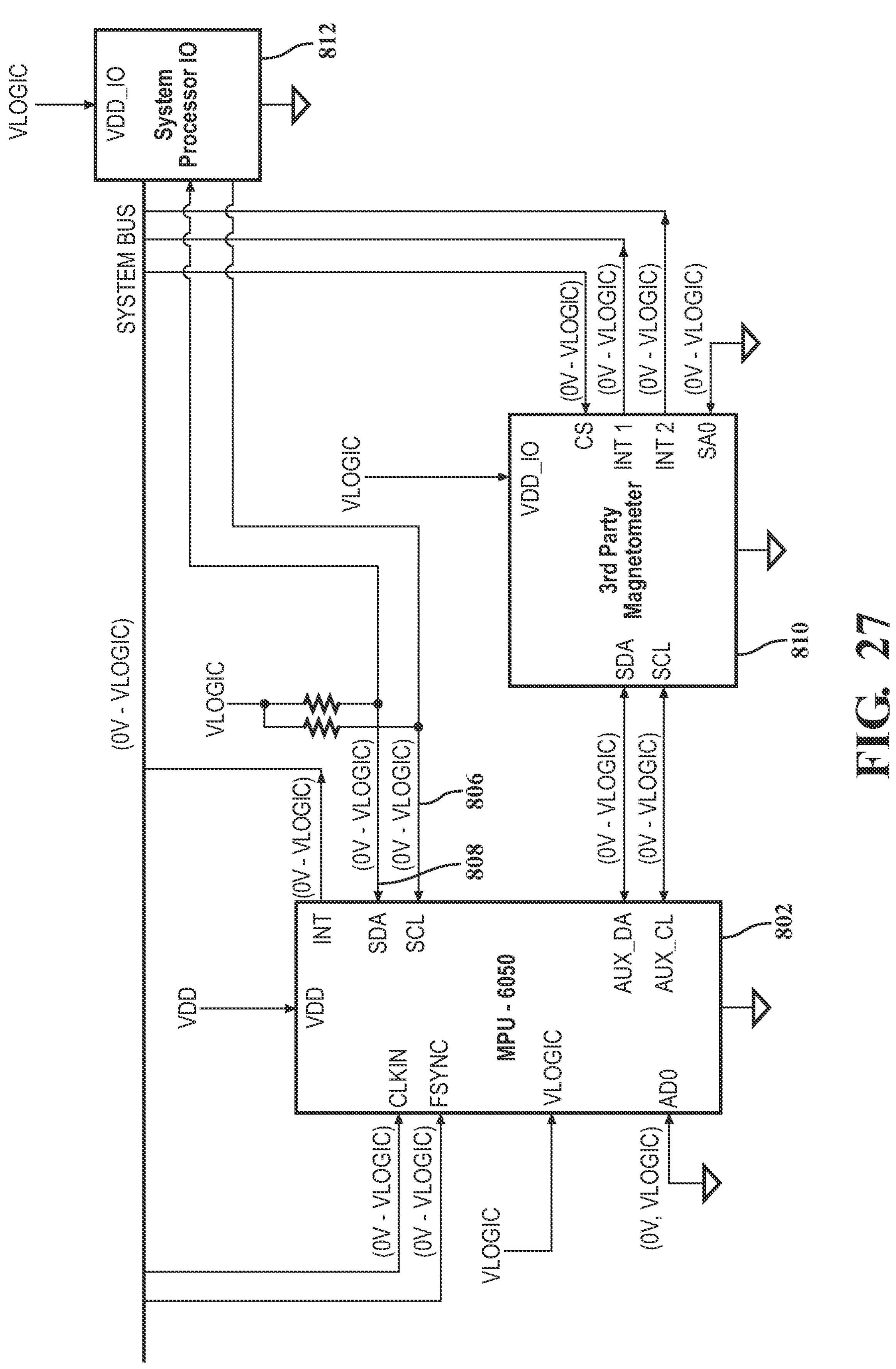
FIG. 27 is a schematic diagram of a soundbar circuit configured to reverse its channel and speaker connections based on the vertical orientation of the soundbar relative to the Earth.

In FIG. 27 a schematic diagram of an inertial sensor 802 is shown interconnected via an I2C bus 808 and 806 to a local processor 812 of soundbar controller 812. Soundbar controller 812 is configured to alter the connections between first and second speaker channels and first and second speakers based on the vertical orientation detected by inertial sensor 802. Magnetometer 810 may also be provided to provide compass data, that is orientation to the north, south, east, or west, etc. The use of orientation semiconductors allows for convenient simplification of audio system setup and operation without the need for manual configuration. The use of inertial sensor 802 is particularly beneficial in the systems disclosed herein which allow a soundbar to be attached to a TV in an "upside down" orientation because it obviates the need for the user to intervene to reconnect the right and left channels of the soundbar to the opposite speakers when the soundbar is attached to the TV in an upside down orientation.

As disclosed, these are some examples of useful embodiments of the invention. The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claims.

The invention claimed is:

1. A soundbar, comprising:

a housing;

at least one speaker located in the housing; and a biased lock arranged at an upper surface of the housing, the biased lock having a locked and an unlocked condition, wherein the biased lock is movable from an unlocked condition to a locked condition in response to a force applied by a detent to a first detent engagement surface of the biased lock, wherein application of the force to the first detent engagement surface causes the biased lock to move downward relative to the upper surface of the housing and removal of the force causes the biased lock to move upward relative to the upper surface of the housing, and wherein when the biased lock is in the locked condition, the housing is restrained from moving relative to the detent along at least one axis of the housing.

2. The soundbar of claim 1, further comprising a soundbar installation groove formed in the housing, wherein when the biased lock is in the unlocked condition, the biased lock projects into the soundbar installation groove and is selectively depressible by the detent to a position beneath the sound installation groove.

3. The soundbar of claim 2, wherein when the biased lock is in the unlocked condition, the biased lock extends a first distance into the soundbar installation groove along a housing height axis, and when the biased lock is in the locked condition, the biased lock extends a second distance along the housing height axis into the soundbar installation groove, and the first distance is greater than the second distance.

4. The soundbar of claim 2, wherein the housing has first and second horizontal walls, and the soundbar installation groove is formed in one of the first and second horizontal walls.

5. The soundbar of claim 2, wherein the biased lock comprises a spring and a polygonal member, wherein when the biased lock is in the unlocked condition, the spring is in an uncompressed condition.

6. The soundbar of claim 4, wherein the soundbar installation groove includes an upper wall and a lower wall positioned adjacent one another along a housing height axis, and the soundbar installation groove has a first width along a housing length axis defined by the upper wall that is less than a second width along the housing length axis defined by the lower wall.

7. The soundbar of claim 1, wherein the first detent engagement surface is shaped such that when a force parallel to a thickness axis of the housing is applied to the first detent engagement surface, the first detent engagement surface is displaced in a direction along a height axis of the housing.

8. The soundbar of claim 7, wherein the biased lock comprises a second detent engagement surface shaped such that when the soundbar is in the locked condition, the second detent engagement surface abuttingly engages the detent.

9. The soundbar of claim 7, wherein the biased lock comprises a polygonal member that includes the first detent engagement surface and further comprises a spring that applies a biasing force against the polygonal member in the direction along the height axis of the housing.

10. The soundbar of claim 7, wherein the biased lock comprises a spherical member that includes the first detent engagement surface and further comprises a spring that applies a biasing force against the spherical member in the direction along the height axis of the housing.

11. The soundbar of claim 1, wherein the first detent engagement surface is shaped such that when a force parallel to a thickness axis of the housing is applied to the first detent engagement surface, the first detent engagement surface is displaced in a direction along a length axis of the housing.

12. The soundbar of claim 11, wherein the biased lock comprises a second detent engagement surface shaped such that when the biased lock is in the locked configuration, the second detent engagement surface abuttingly engages the detent.

13. The soundbar of claim 11, wherein the biased lock comprises a clamp that includes the first detent engagement surface and further comprises a spring that applies a biasing force against the clamp in the direction along the length axis of the housing.

14. The soundbar of claim 1, further comprising an inertial sensor configured to detect an orientation of the soundbar relative to the Earth.

15. The soundbar of claim 14, wherein the at least one speaker comprises a first speaker and a second speaker spaced apart along a length axis of the housing, and the soundbar comprises a first horizontal surface and a second horizontal surface, a first channel, and a second channel, and wherein when the first horizontal surface is vertically above the second horizontal surface, the first channel is selectively connected to the first speaker, and the second channel is selectively connected to the second speaker, and when the second horizontal surface is vertically above the first horizontal surface, the second channel is selectively connected to the first speaker, and the first channel is selectively connected to the second speaker.

16. An audio-visual system, comprising:

the soundbar of claim 1;

a video monitor having a top surface, a bottom surface, and a fastener having the detent and connected to the bottom surface, wherein when the soundbar is attached to the video monitor, and the biased lock is in the locked condition, the detent is restrained by the biasing lock from moving along at least one of a housing length axis, a housing width axis, and a housing height axis.

17. The audio-visual system of claim 16, wherein a soundbar installation groove is defined by a wall formed in the housing, wherein the wall defines a retaining surface, and when the biased lock is in the locked condition, the detent is restrained from moving along the height axis of the housing by the retaining surface.

18. An audio-visual system, comprising:

the soundbar of claim 1, wherein the biased lock comprises a biased member with an L-shaped cross-section and a lip and further comprises a spring that biases the biased member along a height axis of the housing; and a video monitor comprising a top surface a bottom surface and a fastener comprising the detent, wherein when the biased lock is in the locked condition, the soundbar is restrained from moving along a thickness axis of the video monitor by engagement of the detent and the biased member lip.

19. An audio visual system, comprising:

a soundbar comprising a housing, a first speaker, a second speaker, a first channel, and a second channel, wherein the housing has a first horizontal wall and a second horizontal wall, and when the first horizontal wall is vertically above the second horizontal wall, the soundbar is configured to selectively connect the first channel with the first speaker and the second channel with the second speaker, and when the second horizontal wall is vertically above the first horizontal wall, the soundbar is configured to selectively connect the second channel with the first speaker and the first channel with the second speaker;

a video monitor having a top surface and a bottom surface, wherein the second horizontal wall of the soundbar is connected to the bottom surface of the video monitor.

20. The audio visual system of claim 19, wherein the soundbar further comprises an inertial sensor configured to determine an orientation of the soundbar relative to the Earth and a controller, when the first horizontal wall is vertically above the second horizontal wall, the inertial sensor transmits a first signal to the controller, and when the second horizontal wall is vertically above the first horizontal wall, the inertial sensor transmits a second signal to the controller, and wherein in response to the first signal, the controller connects the first channel with the first speaker and the second channel with the second speaker, and in response to the second signal, the controller connects the second channel to the first speaker and the first channel to the second speaker.

* * * * *